US012224104B2

(12) United States Patent
Sato et al.

(10) Patent No.: US 12,224,104 B2
(45) Date of Patent: Feb. 11, 2025

(54) ELECTRONIC COMPONENT

(71) Applicant: TDK CORPORATION, Tokyo (JP)

(72) Inventors: Shinichi Sato, Tokyo (JP); Yohei Tadaki, Tokyo (JP); Akihiko Oide, Tokyo (JP); Yuma Ishikawa, Tokyo (JP); Hidekazu Sato, Tokyo (JP); Kazuhiro Ebina, Tokyo (JP); Hiroyuki Tanoue, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/945,396

(22) Filed: Sep. 15, 2022

(65) Prior Publication Data

US 2023/0005656 A1 Jan. 5, 2023

Related U.S. Application Data

(62) Division of application No. 16/715,245, filed on Dec. 16, 2019, now Pat. No. 11,482,371, which is a (Continued)

(30) Foreign Application Priority Data

Apr. 21, 2016 (JP) ................................ 2016-085495
Apr. 21, 2016 (JP) ................................ 2016-085496
Apr. 27, 2016 (JP) ................................ 2016-089425

(51) Int. Cl.
*H01F 27/28* (2006.01)
*H01F 17/00* (2006.01)
(Continued)

(52) U.S. Cl.
CPC ..... *H01F 27/2804* (2013.01); *H01F 17/0013* (2013.01); *H01F 27/29* (2013.01); (Continued)

(58) Field of Classification Search
CPC ......... H01F 27/2804; H01F 2027/2809; H01F 27/323; H01F 27/292; H01F 27/29; H01F 17/0013
(Continued)

(56) References Cited

U.S. PATENT DOCUMENTS 4,780,702 A 10/1988 Snel et al.
4,842,352 A 6/1989 Sasaki et al.
(Continued)

FOREIGN PATENT DOCUMENTS

CA 2160829 C * 7/1999 ............. C04B 35/47
CN 101499340 A 8/2009
(Continued)

*Primary Examiner* — Shawki S Ismail
(74) *Attorney, Agent, or Firm* — Oliff PLC

(57) ABSTRACT

An electronic component includes: an element body in which a plurality of insulator layers are stacked; a coil in which a plurality of inner conductors installed in the element body are electrically connected to each other; and an outer electrode that is disposed on an outer surface of the element body, is electrically connected to the coil, and includes at least a baked electrode layer. The inner conductor connected to the outer electrode includes a connection conductor that electrically connects the baked electrode layer to the inner conductor. The connection conductor includes a protruding portion that protrudes from the outer surface of the element body to the outer electrode. The protruding portion includes a metal having a smaller diffusion coefficient than a metal of a main component included in the baked electrode layer. The inner conductors have a lower electric resistance value than the metal included in the protruding portion.

4 Claims, 14 Drawing Sheets

Related U.S. Application Data division of application No. 15/488,876, filed on Apr. 17, 2017, now Pat. No. 10,541,078.

(51) Int. Cl.
*H01F 27/29* (2006.01)
*H01F 27/32* (2006.01)
*H01F 41/04* (2006.01)
*H01F 41/12* (2006.01)

(52) U.S. Cl.
CPC ......... *H01F 27/292* (2013.01); *H01F 27/323* (2013.01); *H01F 41/041* (2013.01); *H01F 41/122* (2013.01); *H01F 2027/2809* (2013.01)

(58) Field of Classification Search
USPC .......................................................... 336/200
See application file for complete search history.

(56) References Cited

U.S. PATENT DOCUMENTS

| | | | | |
|---|---|---|---|---|
| 5,020,214 | A | 6/1991 | Tsuruoka et al. | |
| 5,250,923 | A | 10/1993 | Ushiro et al. | |
| 5,339,068 | A * | 8/1994 | Tsunoda | H01C 1/142 338/308 |
| 5,695,860 | A | 12/1997 | Imaichi et al. | |
| 5,815,065 | A | 9/1998 | Hanamura | |
| 6,055,721 | A | 5/2000 | Mamada et al. | |
| 6,232,867 | B1 | 5/2001 | Yoshida et al. | |
| 6,362,713 | B1 | 3/2002 | Masuda et al. | |
| 6,535,105 | B2 * | 3/2003 | Heistand, II | H01G 2/12 338/307 |
| 6,791,444 | B1 | 9/2004 | Masuda et al. | |
| 6,946,945 | B2 | 9/2005 | Sato | |
| 7,671,715 | B2 | 3/2010 | Iwase | |
| 7,791,450 | B2 | 9/2010 | Choi et al. | |
| 7,813,104 | B2 | 10/2010 | Nakano et al. | |
| 8,362,866 | B2 | 1/2013 | Matsuura et al. | |
| 8,813,346 | B2 | 8/2014 | Ogawa et al. | |
| 9,490,062 | B2 | 11/2016 | Yoon et al. | |
| 10,366,834 | B1 * | 7/2019 | Lee | H01G 4/012 |
| 10,575,404 | B2 | 2/2020 | Yoshida et al. | |
| 10,770,232 | B2 * | 9/2020 | Han | H01G 4/232 |
| 10,818,438 | B2 | 10/2020 | Sato et al. | |
| 10,861,651 | B2 * | 12/2020 | Lee | H01G 4/12 |
| 11,037,710 | B2 | 6/2021 | Ravindranathan et al. | |
| 11,087,909 | B2 | 8/2021 | Maruyama et al. | |
| 11,749,459 | B2 * | 9/2023 | Lee | H01G 4/232 361/301.4 |
| 2004/0043550 | A1 | 3/2004 | Chakihara et al. | |
| 2004/0119579 | A1 * | 6/2004 | Takehana | H01C 17/283 338/20 |
| 2006/0202286 | A1 | 9/2006 | Chakihara et al. | |
| 2006/0208319 | A1 | 9/2006 | Chakihara et al. | |
| 2009/0108984 | A1 | 4/2009 | Choi et al. | |
| 2009/0140342 | A1 | 6/2009 | Chakihara et al. | |
| 2009/0191418 | A1 | 7/2009 | Nakano et al. | |
| 2009/0323253 | A1 | 12/2009 | Kobayashi et al. | |
| 2010/0136778 | A1 | 6/2010 | Chakihara et al. | |
| 2010/0290172 | A1 * | 11/2010 | Motoki | H01G 4/232 427/79 |
| 2011/0037557 | A1 | 2/2011 | Konoue et al. | |
| 2011/0051314 | A1 | 3/2011 | Sakurai et al. | |
| 2011/0230041 | A1 | 9/2011 | Chakihara et al. | |
| 2012/0147517 | A1 * | 6/2012 | Hur | H01G 4/30 29/25.42 |
| 2012/0188049 | A1 | 7/2012 | Matsuura et al. | |
| 2014/0085767 | A1 | 3/2014 | Kang | |
| 2014/0145816 | A1 | 5/2014 | Sato et al. | |
| 2015/0084487 | A1 | 3/2015 | Mori et al. | |
| 2015/0085422 | A1 * | 3/2015 | Kim | H01G 4/2325 156/89.18 |
| 2015/0162124 | A1 * | 6/2015 | Kim | H01F 41/005 336/200 |
| 2016/0276106 | A1 | 9/2016 | Kuroiwa et al. | |
| 2019/0103224 | A1 * | 4/2019 | Han | H01G 4/2325 |
| 2021/0082622 | A1 * | 3/2021 | Kim | H01G 4/30 |
| 2021/0193391 | A1 * | 6/2021 | Yi | H01G 4/1218 |
| 2022/0172895 | A1 * | 6/2022 | Lee | H01G 4/232 |

FOREIGN PATENT DOCUMENTS

| | | | | |
|---|---|---|---|---|
| CN | 102005297 | A | 4/2011 | |
| CN | 102007551 | A | 4/2011 | |
| CN | 105283932 | A | 1/2016 | |
| CN | 105940469 | A * | 9/2016 | H01F 17/0033 |
| CN | 105977019 | A * | 9/2016 | H01G 4/008 |
| EP | 0953997 | A1 | 11/1999 | |
| JP | H04-003407 | A | 1/1992 | |
| JP | H05-226154 | A | 9/1993 | |
| JP | H05-251210 | A | 9/1993 | |
| JP | H06-295803 | A | 10/1994 | |
| JP | H07-176430 | A | 7/1995 | |
| JP | H08-031616 | A | 2/1996 | |
| JP | H09-007879 | A | 1/1997 | |
| JP | H09-190950 | A | 7/1997 | |
| JP | 2000164406 | A * | 6/2000 | |
| JP | 3255799 | B2 * | 2/2002 | |
| JP | 2003068508 | A * | 3/2003 | |
| JP | 2004088040 | A * | 3/2004 | |
| JP | 2004-128448 | A | 4/2004 | |
| JP | 2007-073882 | A | 3/2007 | |
| JP | 2007-242995 | A | 9/2007 | |
| JP | 2010-040860 | A | 2/2010 | |
| JP | 2010-080703 | A | 4/2010 | |
| JP | 2012151175 | A * | 8/2012 | |
| JP | 2012169334 | A * | 9/2012 | |
| JP | 2016-054225 | A | 4/2016 | |
| JP | 2019212727 | A * | 12/2019 | H01G 4/232 |
| JP | 2021190546 | A * | 12/2021 | |
| WO | 2014199752 | A1 | 12/2014 | |
| WO | WO-2020195523 | A1 * | 10/2020 | H01G 13/00 |

* cited by examiner

ELECTRONIC COMPONENT

CROSS-REFERENCE

This Application is a Division of U.S. patent application Ser. No. 16/715,245, filed Dec. 16, 2019, which in turn is a Division of U.S. patent application Ser. No. 15/488,876, filed Apr. 17, 2017. This Application claims foreign priority to: Japanese Patent Application No. 2016-089425, filed Apr. 27, 2016; Japanese Patent Application No. 2016-085496, filed Apr. 21, 2016; and Japanese Patent Application No. 2016-085495, filed Apr. 21, 2016. The entire contents of the above applications are incorporated herein by reference.

BACKGROUND OF THE INVENTION

Field of the Invention

The present invention relates to an electronic component.

Related Background Art

Japanese Unexamined Patent Publication No. H9-007879 discloses an electronic component. The electronic component described in Japanese Unexamined Patent Publication No. H9-007879 includes an element body, an inner conductor that is disposed in the element body, and an outer electrode that is electrically connected to the inner conductor. In the electronic component described in Japanese Unexamined Patent Publication No. H9-007879, a glass layer is disposed between the element body and the outer electrode and the inner conductor is connected to the outer electrode by penetrating the glass layer.

In a stacked coil component, an inner conductor is generally formed of a conductive material including metals Ag and Pd. However, when the inner conductor is formed of an alloy of Ag and Pd, a manufacturing cost increases because Pd is expensive and DC resistance of a coil increases. On the other hand, when the inner conductor does not include Pd and the inner conductor is formed of Ag, DC resistance of the coil decreases but connection between the inner conductor and an outer electrode may not be satisfactory due to a Kirkendall effect.

An aspect of the invention provides a stacked coil component that can suppress an increase in DC resistance of a coil and achieve improvement in connection between the coil and an outer electrode.

SUMMARY OF THE INVENTION

A stacked coil component according to an aspect of the invention includes: an element body in which a plurality of insulator layers are stacked; a coil in which a plurality of inner conductors installed in the element body are electrically connected to each other; and an outer electrode that is disposed on an outer surface of the element body, is electrically connected to the coil, and includes at least a baked electrode layer, the inner conductor connected to the outer electrode includes a connection conductor that electrically connects the baked electrode layer to the inner conductor, the connection conductor includes a protruding portion that protrudes from the outer surface of the element body to the outer electrode, the protruding portion includes a metal having a smaller diffusion coefficient than a metal of a main component included in the baked electrode layer, and the inner conductors have a lower electric resistance value than the metal included in the protruding portion.

In the stacked coil component according to the aspect of the invention, the inner conductor has a lower electric resistance value than the metal included in the protruding portion. Accordingly, it is possible to suppress an increase in DC resistance of the coil in the stacked coil component according to the aspect. The baked electrode layer of the outer electrode serves as a source of a metal which is used for the connection conductor to protrude from the end surface of the element body to the baked electrode layer and to come in contact with the baked electrode layer due to the Kirkendall effect. In the stacked coil component according to the aspect, the protruding portion of the connection conductor includes a metal which has a smaller diffusion coefficient than the metal of the main component included in the outer electrode. That is, the metal of the main component included in the baked electrode layer has a larger diffusion coefficient than the metal included in the protruding portion and diffuses more easily. Accordingly, in the stacked coil component, the protruding portion is formed by causing the metal to diffuse from the baked electrode layer to the connection conductor in a manufacturing process and causing the connection conductor to expand. In this way, since the protruding portion electrically connecting the connection conductor to the baked electrode layer is formed in the stacked coil component, it is possible to satisfactorily secure connectivity between the inner conductor and the outer electrode. As a result, in the stacked coil component, it is possible to achieve improvement in connectivity between the coil and the outer electrode.

In the aspect, the metal of a main component included in the baked electrode layer is Ag, and the metal included in the protruding portion is Pd. Pd has a smaller diffusion coefficient than Ag. Accordingly, in the stacked coil component according to the aspect, the metal diffuses satisfactorily from the baked electrode layer to the connection conductor in the manufacturing process. Accordingly, in the stacked coil component according to the aspect, since the protruding portion that satisfactorily electrically connects the connection conductor to the baked electrode layer is formed, it is possible to satisfactorily secure connectivity between the inner conductor and the outer electrode. As a result, in the stacked coil component according to the aspect, it is possible to achieve improvement in connectivity between the coil and the outer electrode.

In the aspect, the outer surface of the element body may be covered with a glass layer, and the protruding portion may be electrically connected to the outer electrode by penetrating the glass layer. In this configuration, the outer surface of the element body is covered with the glass layer. Accordingly, for example, when a plated layer of the outer electrode is formed, it is possible to prevent a plating solution from permeating the element body and to prevent a plating metal from being extracted from the outer surface of the element body.

According to the aspect of the invention, it is possible to suppress an increase in DC resistance of a coil and to achieve improvement in connection between the coil and an outer electrode.

DESCRIPTION OF THE PREFERRED EMBODIMENTS

Hereinafter, exemplary embodiments of the invention will be described in detail with reference to the accompanying drawings. In description with reference to the drawings, identical or corresponding elements will be referenced by the same reference signs and description thereof will not be repeated.

First Embodiment

Figure 1:
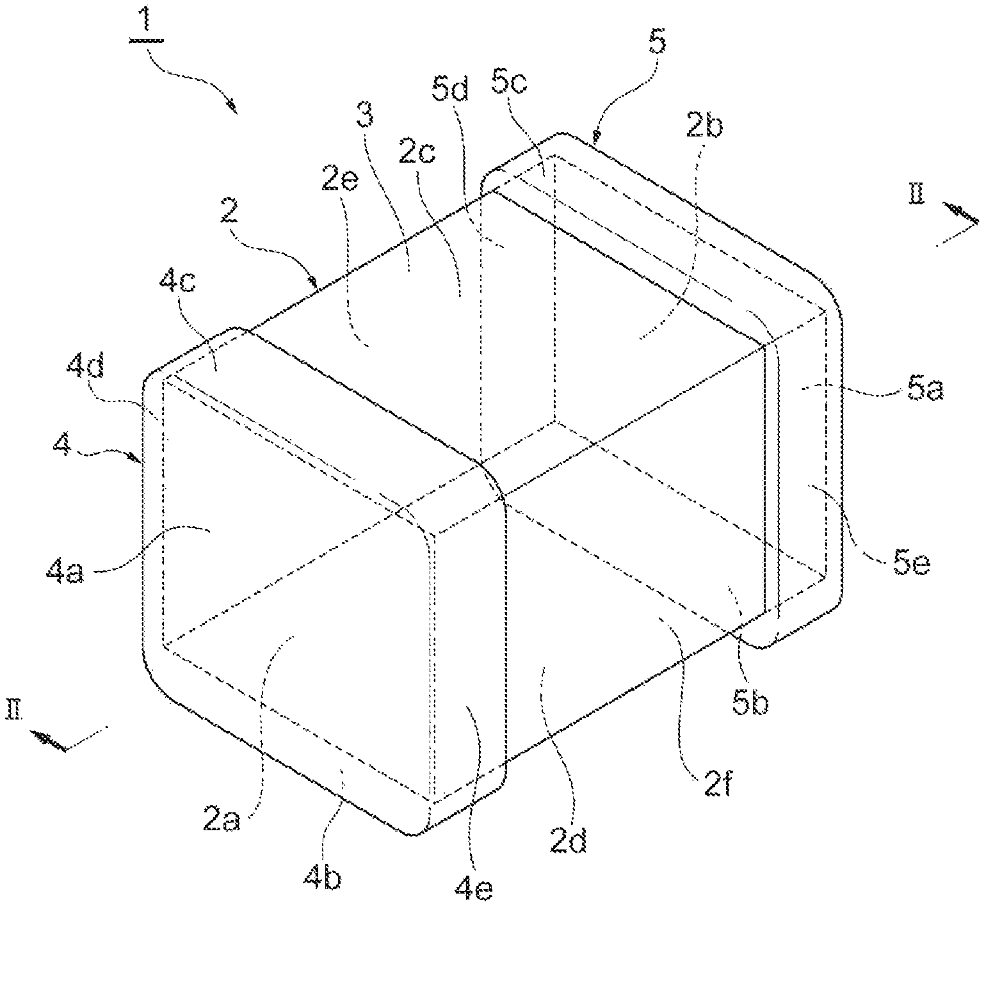
FIG. 1 is a perspective view illustrating a stacked coil component according to a first embodiment.

As illustrated in FIG. 1, a stacked coil component 1 according to a first embodiment includes an element body 2 and a pair of outer electrodes 4 and 5 that are disposed at both ends of the element body 2.

The element body 2 has a rectangular parallelepiped shape. The element body 2 includes a pair of end surfaces 2*a* and 2*b* facing each other, a pair of principal surfaces 2*c* and 2*d* facing each other and extending to connect the pair of end surfaces 2*a* and 2*b* to each other, and a pair of side surfaces 2*e* and 2*f* facing each other and extending to connect the pair of principal surfaces 2*c* and 2*d* to each other. The principal surface 2*c* or the principal surface 2*d* is defined as a surface facing another electronic device, for example, when the stacked coil component 1 is mounted on another electrode device (for example, a circuit board or an electronic component) which is not illustrated.

The direction in which the end surfaces 2*a* and 2*b* face, the direction in which the principal surfaces 2*c* and 2*d* face, and the direction in which the side surfaces 2*e* and 2*f* face are substantially perpendicular to each other. The rectangular parallelepiped shape includes a rectangular parallelepiped shape of which corners and ridges are chamfered and a rectangular parallelepiped shape of which corners and ridges are rounded.

Figure 3:
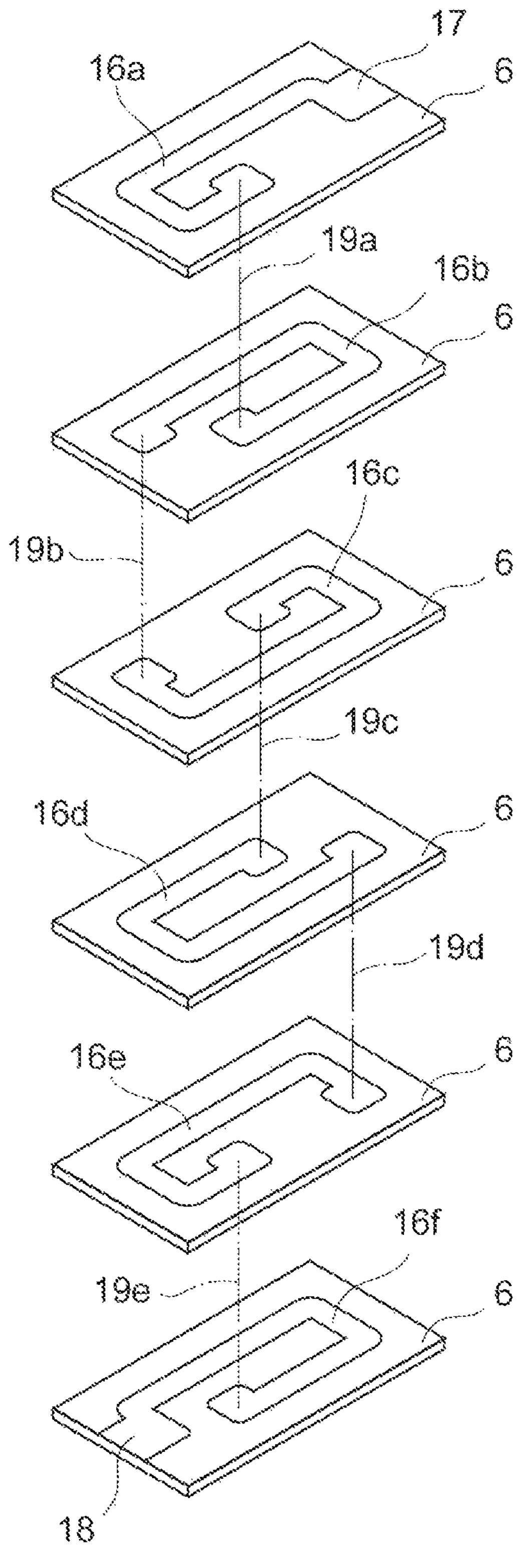
FIG. 3 is a perspective view illustrating a coil conductor of the stacked coil component according to the first embodiment.

The element body 2 is formed by stacking a plurality of insulator layers 6 (see FIG. 3). The insulator layers 6 are stacked in the direction in which the principal surfaces 2*c* and 2*d* of the element body 2 face. That is, the direction in which the insulator layers 6 are stacked matches the direction in which the principal surfaces 2*c* and 2*d* of the element body 2 face. Hereinafter, the direction in which the principal surfaces 2*c* and 2*d* face is also referred to as a "stacking direction." Each insulator layer 6 has a substantially rectangular shape. In the actual element body 2, the insulator layers 6 are integrated such that a boundary between the layers is invisible.

Each insulator layer 6 is formed of, for example, a glass-based ceramic including glass containing strontium, calcium, alumina, and silicon dioxide and alumina. Each insulator layer 6 may be formed of a ferrite (such as a Ni—Cu—Zn-based ferrite, a Ni—Cu—Zn—Mg-based ferrite, a Cu—Zn-based ferrite, or Ni—Cu-based ferrite), some insulator layers 6 may be formed of a nonmagnetic ferrite.

Figure 2:
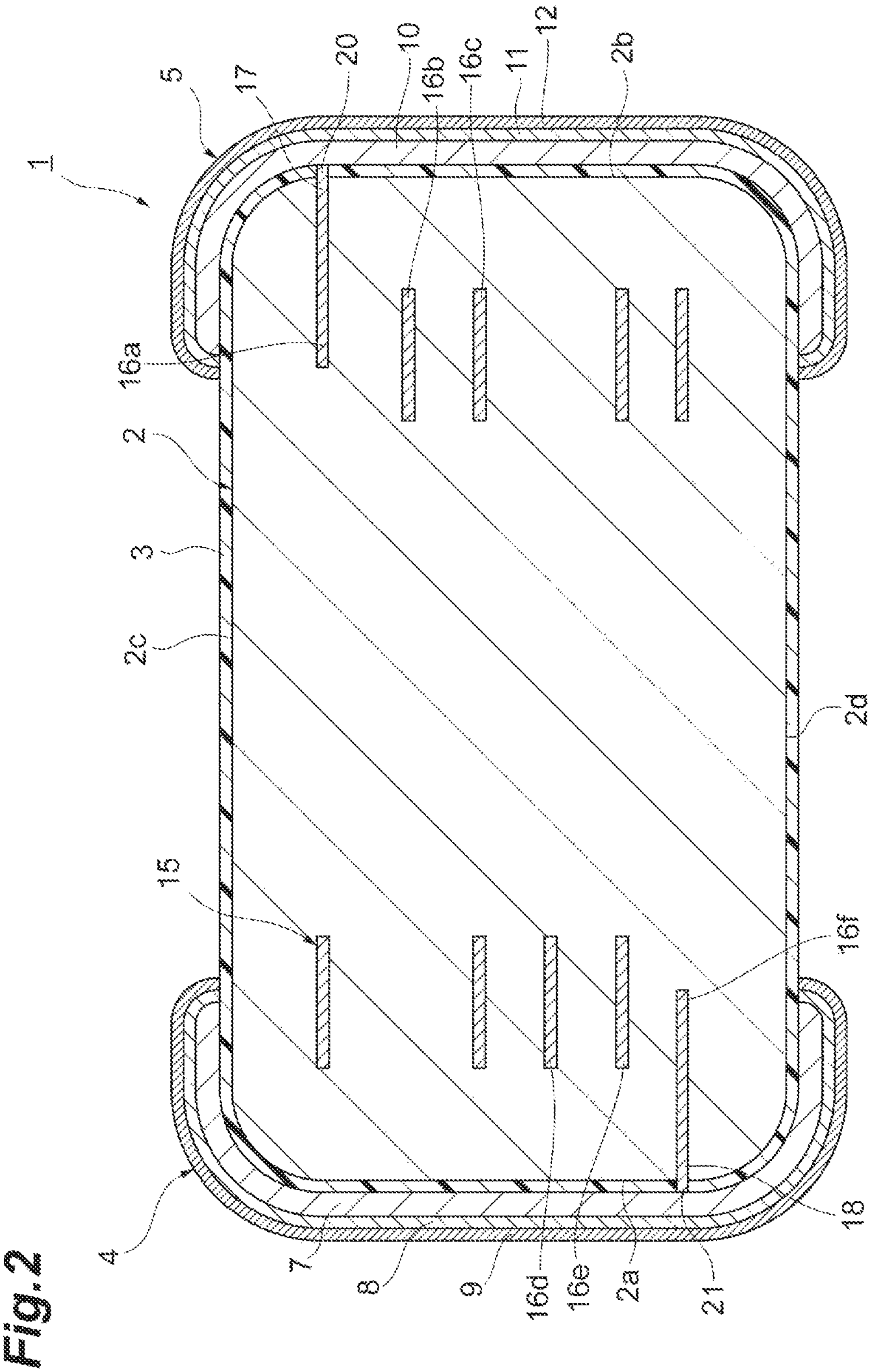
FIG. 2 is a diagram illustrating a cross-sectional configuration taken along line II-II in FIG. 1.

As illustrated in FIG. 2, a glass layer 3 is formed on the outer surface of the element body 2 (the end surfaces 2*a* and 2*b*, the principal surfaces 2*c* and 2*d*, and the side surfaces 2*e* and 2*f*). The thickness of the glass layer 3 ranges, for example, from 0.5 μm to 10 μm. It is preferable that the glass layer 3 have a high softening point, and the softening point is, for example, equal to or higher than 600° C.

The outer electrode 4 is disposed on the end surface 2*a* side of the element body 2. The outer electrode 5 is disposed on the end surface 2*b* side of the element body 2. That is, the outer electrodes 4 and 5 are separated from each other in the direction in which the pair of end surfaces 2*a* and 2*b* faces each other. The outer electrodes 4 and 5 have a substantially rectangular shape in a plan view and the corners thereof are rounded.

The outer electrode 4 includes a baked electrode layer 7, a first plated layer 8, and a second plated layer 9. In the outer electrode 4, the baked electrode layer 7, the first plated layer 8, and the second plated layer 9 are arranged in this order from the element body 2 side. The baked electrode layer 7 includes a conductive material. The baked electrode layer 7 is formed as a sintered compact of a conductive paste including conductive metal powder (Ag powder in this embodiment) and glass frit. The first plated layer 8 is, for example, an Ni-plated layer. The second plated layer 9 is, for example, an Sn-plated layer.

As illustrated in FIG. 1, the outer electrode 4 includes five electrode portions of an electrode portion 4*a* located on the end surface 2*a*, an electrode portion 4*b* located on the principal surface 2*d*, an electrode portion 4*c* located on the principal surface 2*c*, an electrode portion 4*d* located on the side surface 2*e*, and an electrode portion 4*e* located on the side surface 2*f*. The electrode portion 4*a* covers a whole of the end surface 2*a*. The electrode portion 4*b* covers a part of the principal surface 2*d*. The electrode portion 4*c* covers a part of the principal surface 2*c*. The electrode portion 4*d* covers a part of the side surface 2*e*. The electrode portion 4*e* covers a part of the side surface 2*f*. The five electrode portions 4*a*, 4*b*, 4*c*, 4*d*, and 4*e* are integrally formed.

As illustrated in FIG. 2, the outer electrode 5 includes a baked electrode layer 10, a first plated layer 11, and a second plated layer 12. In the outer electrode 5, the baked electrode layer 10, the first plated layer 11, and the second plated layer 12 are arranged in this order from the element body 2 side. The baked electrode layer 10 includes a conductive material.

The baked electrode layer 10 is formed as a sintered compact of a conductive paste including conductive metal powder (Ag powder in this embodiment) and glass frit. The first plated layer 11 is, for example, an Ni-plated layer. The second plated layer 12 is, for example, an Sn-plated layer.

As illustrated in FIG. 1, the outer electrode 5 includes five electrode portions of an electrode portion 5*a* located on the end surface 2*b*, an electrode portion 5*b* located on the principal surface 2*d*, an electrode portion 5*c* located on the principal surface 2*c*, an electrode portion 5*d* located on the side surface 2*e*, and an electrode portion 5*e* located on the side surface 2*f*. The electrode portion 5*a* covers a whole of the end surface 2*b*. The electrode portion 5*b* covers a part of the principal surface 2*d*. The electrode portion 5*c* covers a part of the principal surface 2*c*. The electrode portion 5*d* covers a part of the side surface 2*e*. The electrode portion 5*e* covers a part of the side surface 2*f*. The five electrode portions 5*a*, 5*b*, 5*c*, 5*d*, and 5*e* are integrally formed.

As illustrated in FIG. 2, the stacked coil component 1 includes a coil 15 that is disposed in the element body 2. As illustrated in FIG. 3, the coil 15 includes a plurality of coil conductors (inner conductors) 16*a*, 16*b*, 16*c*, 16*d*, 16*e*, and 16*f*.

The plurality of coil conductors 16*a* to 16*f* are formed of a material having a smaller electric resistance value than the metal (Pd) included in protruding portions 20 and 21 to be described later. In this embodiment, the plurality of coil conductors 16*a* to 16*f* include Ag as a conductive material. The plurality of coil conductors 16*a* to 16*f* are formed as sintered compacts of a conductive paste including Ag as a conductive material. As illustrated in FIG. 2, the coil conductor 16*a* includes a connection conductor 17. The connection conductor 17 is disposed on the end surface 2*b* side of the element body 2 and electrically connects the coil conductor 16*a* to the outer electrode 5. The coil conductor 16*f* includes a connection conductor 18. The connection conductor 18 is disposed on the end surface 2*a* side of the element body 2 and electrically connects the coil conductor 16*f* to the outer electrode 4. The connection conductor 17 and the connection conductor 18 are formed of Ag and Pd as conductive materials. In this embodiment, a conductor pattern of the coil conductor 16*a* and a conductor pattern of the connection conductor 17 are integrally formed continuous, and a conductor pattern of the coil conductor 16*f* and a conductor pattern of the connection conductor 18 are integrally formed continuous.

The coil conductors 16*a* to 16*f* are arranged in the stacking direction of the insulator layers 6 in the element body 2. The coil conductors 16*a* to 16*f* are arranged in the order of the coil conductor 16*a*, the coil conductor 16*b*, the coil conductor 16*c*, the coil conductor 16*d*, the coil conductor 16*e*, and the coil conductor 16*f* from the outermost layer.

As illustrated in FIG. 3, the ends of the coil conductors 16*a* to 16*f* are connected by through-hole conductors 19*a* to 19*e*. Accordingly, the coil conductors 16*a* to 16*f* are electrically connected to each other and the coil 15 is formed in the element body 2. The through-hole conductors 19*a* to 19*e* include Ag as a conductive material and are formed as sintered compacts of a conductive material including the conductive material.

As illustrated in FIG. 2, the connection conductor 17 includes a protruding portion 20. The protruding portion 20 is disposed on the end surface 2*b* side of the element body 2 in the connection conductor 17. The protruding portion 20 protrudes from the end surface 2*b* of the element body 2 to the outer electrode 5. The protruding portion 20 penetrates the glass layer 3 and is connected to the baked electrode layer 10 of the outer electrode 5. The protruding portion 20 includes a metal (Pd) having a smaller diffusion coefficient than the metal (Ag) of the main component included in the outer electrode 5 (the baked electrode layer 10). In this embodiment, the protruding portion 20 includes Ag and Pd.

The connection conductor 18 includes a protruding portion 21. The protruding portion 21 is disposed on the end surface 2*a* side of the element body 2 in the connection conductor 18. The protruding portion 21 protrudes from the end surface 2*a* of the element body 2 to the outer electrode 4. The protruding portion 21 penetrates the glass layer 3 and is connected to the baked electrode layer 7 of the outer electrode 4. The protruding portion 21 includes a metal (Pd) having a smaller diffusion coefficient than the metal (Ag) of the main component included in the outer electrode 4 (the baked electrode layer 7). In this embodiment, the protruding portion 21 includes Ag and Pd. The metal (Pd) included in the protruding portions 20 and 21 has a larger electric resistance value than the plurality of coil conductors 16*a* to 16*f*.

A method of manufacturing the stacked coil component 1 will be described below with reference to FIGS. 4A and 4B and FIGS. 5A and 5B.

Figure 4A:
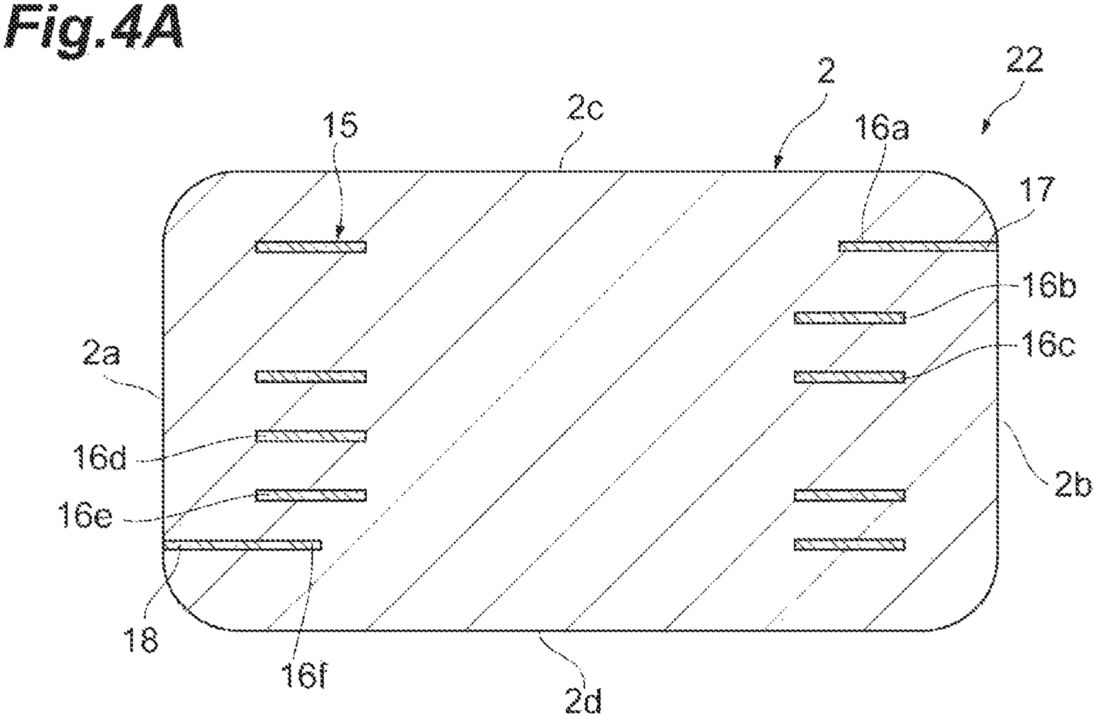
FIGS. 4A and 4B are diagrams illustrating a method of manufacturing the stacked coil component according to the first embodiment.

As illustrated in FIG. 4A, first, a stacked body 22 including element body 2 and the coil 15 is formed. Specifically, ceramic powder, organic solvent, organic binder, plasticizer, and the like are mixed to form ceramic slurry, and then the ceramic slurry is shaped into a sheet shape using a doctor blade method to acquire a ceramic green sheet. Subsequently, by screen-printing a conductive paste containing Ag as a metal component on the ceramic green sheet, the conductor patterns of coil conductors 16*a* to 16*f*.

The connection conductor 17 of the coil conductor 16*a* is formed of a conductive paste containing Ag and Pd as metal components. The connection conductor 18 of the coil conductor 16*f* is formed of a conductive paste containing Ag and Pd as metal components. The conductor patterns of the connection conductor 17 and the connection conductor 18 may be formed on the ceramic green sheet using the conductive paste containing Ag and Pd as metal components, or may be formed by superimposing the conductive paste containing Ag and Pd as metal components on the conductor patterns formed of the conductive paste containing Ag as a metal component. The ceramic green sheets on which the conductor patterns are formed are stacked, and the resultant is subjected to a binder removing process in the atmosphere and is then subjected to baking. Accordingly, the stacked body 22 is obtained.

Figure 4B:
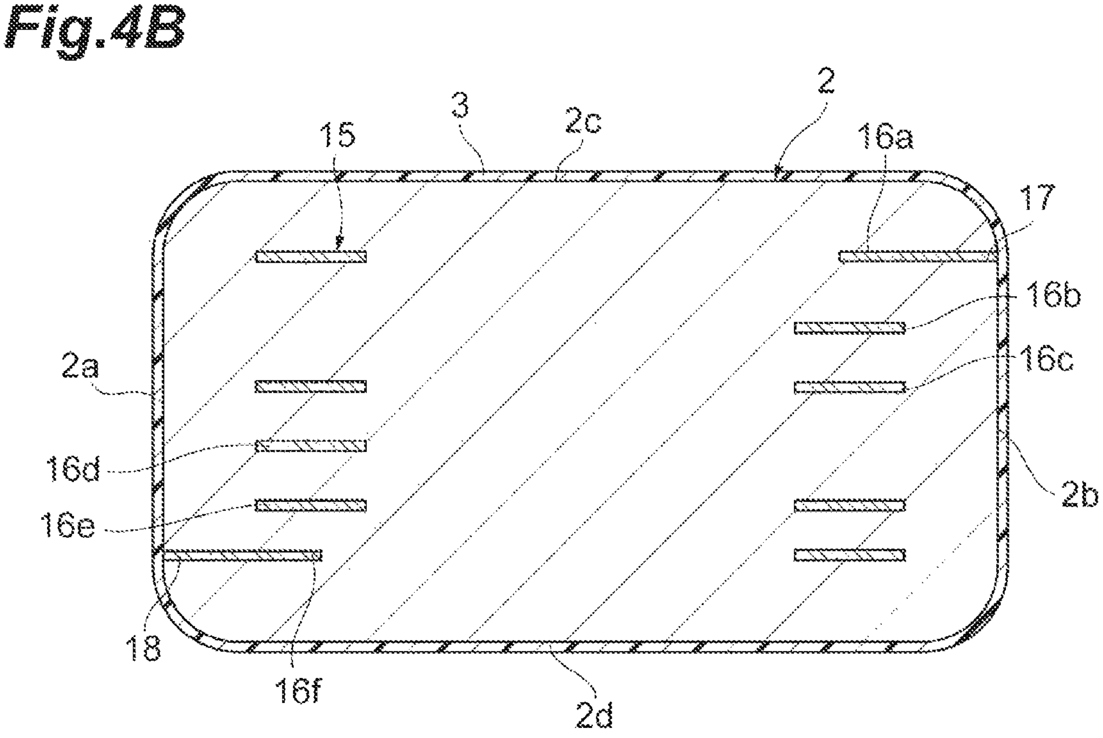

Subsequently, as illustrated in FIG. 4B, the glass layer 3 is formed. Specifically, the glass layer 3 is formed by applying glass slurry including glass powder, binder resin, solvent, and the like on the entire surface of the element body 2. The application of the glass slurry is performed, for example, using a barrel spray method. The glass layer 3 is formed by simultaneously baking the glass slurry and a conductive paste to be described later for forming the baked electrode layers 7 and 10. Accordingly, in FIG. 4B, a state in which the glass layer 3 is formed on the element body 2 is illustrated, but the glass layer 3 is actually formed when the baked electrode layers 7 and 10 are baked.

Figure 5A:
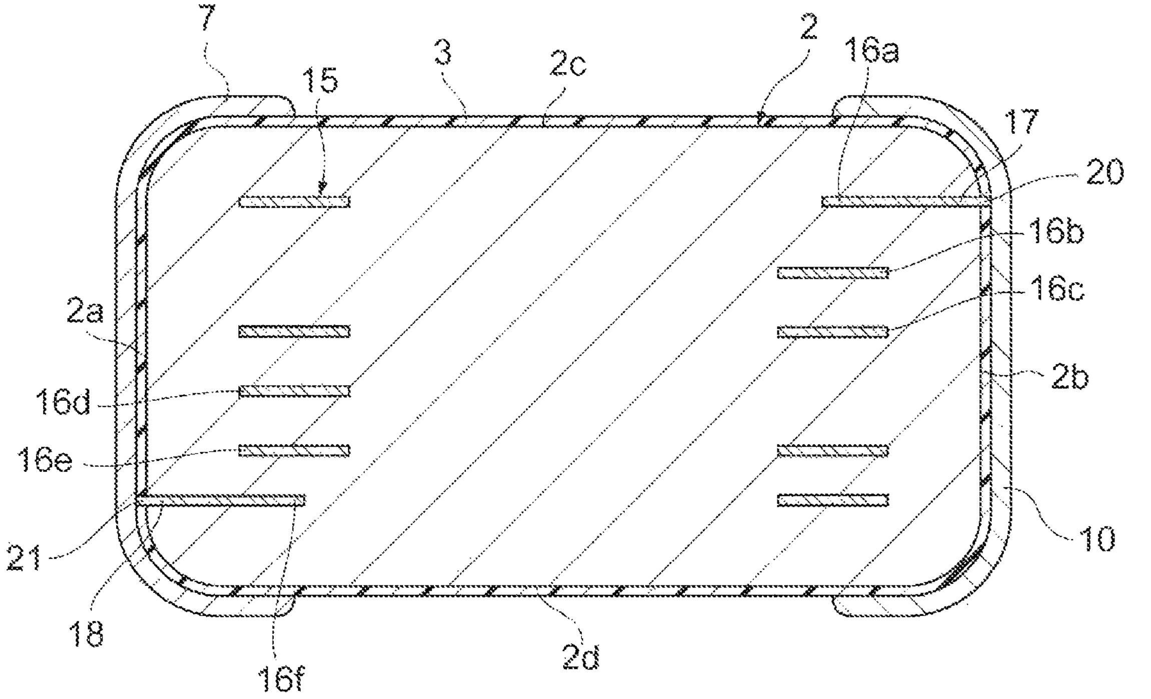
FIGS. 5A and 5B are diagrams illustrating a method of manufacturing the stacked coil component according to the first embodiment.

Subsequently, as illustrated in FIG. 5A, the baked electrode layers 7 and 10 are formed. Specifically, the baked electrode layers 7 and 10 are formed by applying a conductive paste including Ag powder as conductive metal powder and glass frit and baking the resultant. The softening point of the glass frit is preferably lower than the softening point of glass powder forming the glass layer 3. When the conductive paste is baked, the connection conductors 17 and 18 and the baked electrode layers 7 and 10 are electrically connected by the Kirkendall effect.

Figure 6:
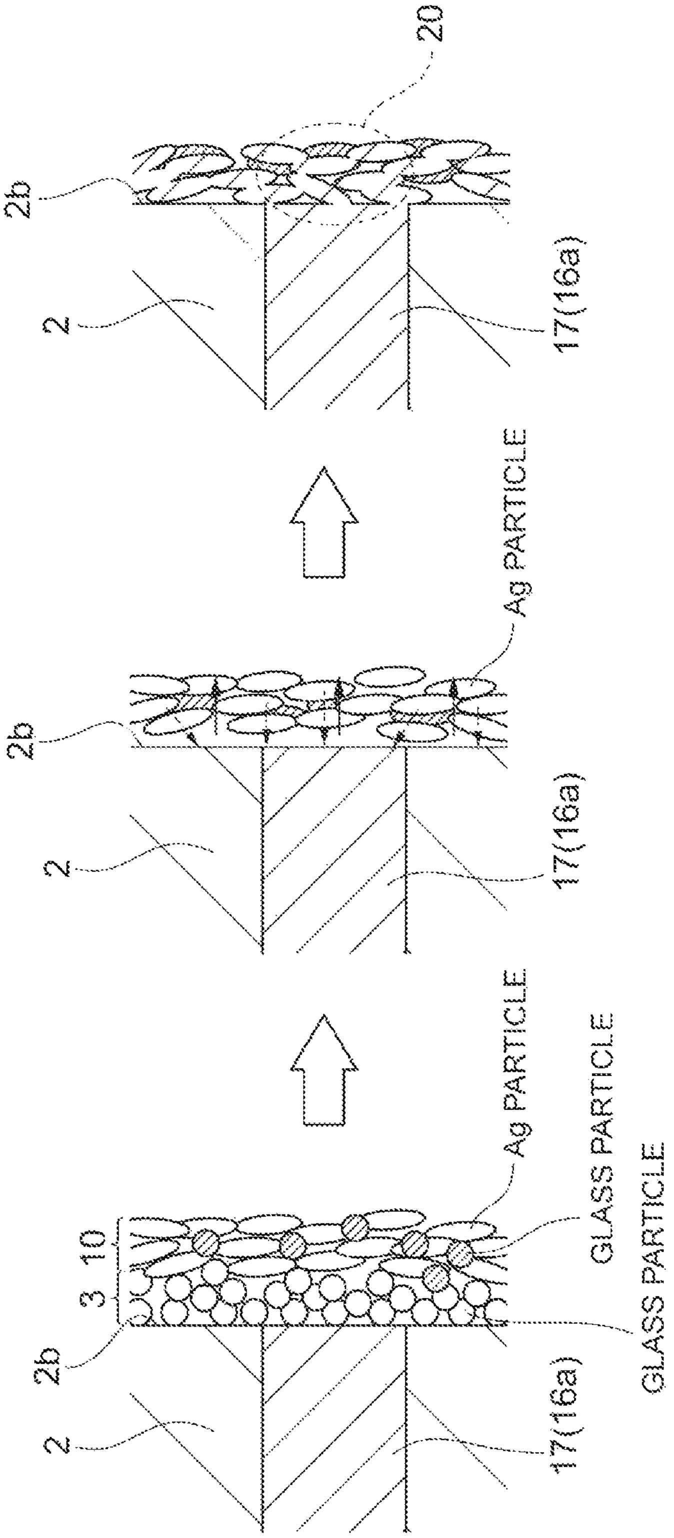
FIG. 6 is a diagram illustrating a method of manufacturing the stacked coil component according to the first embodiment.

Specifically, as illustrated in FIG. 6, when the conductive paste is baked, glass particles included in the glass slurry forming the glass layer 3 are melted and flows. Ag particles (Ag ions) included in the conductive paste having a smaller diffusion coefficient than Pd can be attracted to the connection conductors 17 and 18 including Pd by the Kirkendall effect. Accordingly, the connection conductors 17 and 18 are stretched to the baked electrode layers 7 and 10, and the connection conductors 17 and 18 come in contact with the baked electrode layers 7 and 10. As a result, the connection conductors 17 and 18 are electrically connected to the baked electrode layers 7 and 10 and the protruding portions 20 and 21 penetrating the glass layer 3 are formed.

Figure 5B:
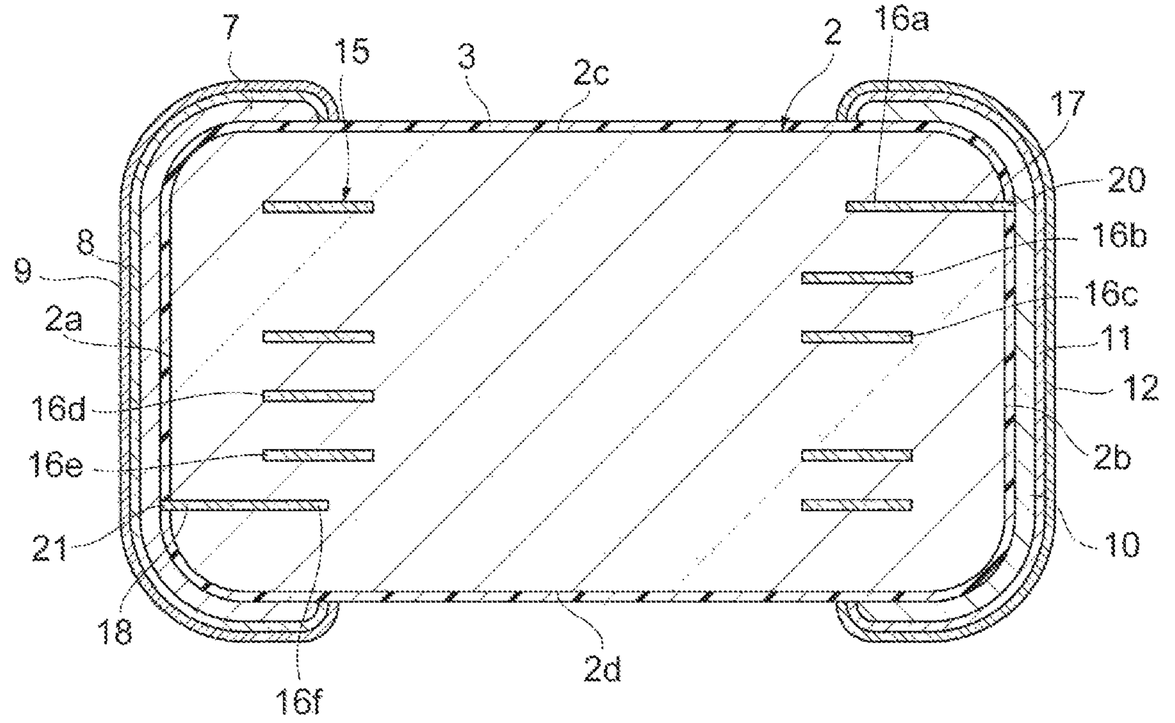

Subsequently, as illustrated in FIG. 5B, the first plated layers 8 and 11 and the second plated layers 9 and 12 are formed. The first plated layers 8 and 11 are Ni-plated layers. The first plated layers 8 and 11 are formed, for example, by extracting Ni in a Watt bath using a barrel plating method. The second plated layers 9 and 12 are Sn-plated layers. The second plated layers 9 and 12 are formed by extracting Sn in a neutral tinning bath using the barrel plating method. In this way, the stacked coil component 1 is manufactured.

As described above, in the stacked coil component 1 according to this embodiment, the coil conductors 16*a* to 16*f* have a lower electric resistance value than the metal included in the protruding portions 20 and 21. Accordingly, in the stacked coil component 1, it is possible to suppress an increase in DC resistance of the coil 15. The baked electrode layers 7 and 10 of the outer electrodes 4 and 5 serve as a metal source which is used for the connection conductors 17 and 18 to protrude from the end surfaces 2*a* and 2*b* of the element body 2 to the baked electrode layers 7 and 10 to come in contact with the baked electrode layers 7 and 10 by the Kirkendall effect. In the stacked coil component 1, the protruding portions 20 and 21 of the connection conductors 17 and 18 include a metal having a smaller diffusion coefficient than the metal of the main component included in the outer electrodes 4 and 5. That is, the metal of the main component included in the baked electrode layers 7 and 10 has a larger diffusion coefficient than the metal included in the protruding portions 20 and 21 and diffuse more easily. Accordingly, in the stacked coil component 1, the protruding portions 20 and 21 are formed by causing the metal to diffuse from the baked electrode layers 7 and 10 to the connection conductors 17 and 18 and causing the connection conductors 17 and 18 to expand in the manufacturing process. In this way, in the stacked coil component 1, since the protruding portions 20 and 21 electrically connecting the connection conductors 17 and 18 to the baked electrode layers 7 and 10 are formed, it is possible to satisfactorily secure connectivity between the coil conductors 16*a* and 16*f* and the outer electrodes 4 and 5. As a result, in the stacked coil component 1, it is possible to achieve improvement in connectivity between the coil 15 and the outer electrodes 4 and 5.

In the stacked coil component 1 according to this embodiment, the metal of the main component included in the baked electrode layers 7 and 10 of the outer electrodes 4 and 5 is Ag and Pd is included as a metal in the protruding portions 20 and 21. Pd has a smaller diffusion coefficient than Ag. Accordingly, in the process of manufacturing the stacked coil component 1, when the glass slurry forming the glass layer 3 and the conductive paste forming the baked electrode layers 7 and 10 are simultaneously baked, Ag included in the conductive paste can be attracted to Pd by the Kirkendall effect. Accordingly, the ends of the connection conductors 17 and 18 expand and the connection conductors 17 and 18 come in contact with the baked electrode layers 7 and 10. Accordingly, the protruding portions 20 and 21 satisfactorily connecting the connection conductors 17 and 18 to the baked electrode layers 7 and 10 are formed. As a result, in the stacked coil component 1, it is possible to achieve improvement in connectivity between the coil 15 and the outer electrodes 4 and 5.

In the stacked coil component 1 according to this embodiment, the glass layer 3 is formed on the surface of the element body 2. Accordingly, in the process of forming the first plated layers 8 and 11 and the second plated layers 9 and 12, it is possible to prevent the plating solution from permeating the element body 2 and to prevent the plating metal from being extracted from the outer surface of the element body 2.

While the first embodiment of the invention has been described above, the invention is not limited to the above-mentioned embodiment but can be modified in various forms without departing from the gist thereof.

In the first embodiment, an example in which the outer electrodes 4 and 5 include the electrode portions 4*a* and 5*a*, the electrode portions 4*b*, 5*b*, 4*c*, and 5*c*, and the electrode portions 4*d*, 5*d*, 4*e*, and 5*e* has been described. However, the shape of the outer electrodes is not limited thereto. For example, the outer electrodes may be formed on only the end surfaces or may be formed on at least one of the end surfaces, the principal surfaces, and the side surfaces.

In the first embodiment, an example in which the outer electrodes 4 and 5 include the first plated layers 8 and 11 and the second plated layers 9 and 12 has been described above. However, the platted layer may be a single layer or three or more layers.

Second Embodiment

A second embodiment will be described below. First, the background and summary of the second embodiment will be described.

Background

Japanese Unexamined Patent Publication No. 2004-128448 discloses an electronic component. The electronic component described in Japanese Unexamined Patent Publication No. 2004-128448 includes an element body, an inner conductor that is disposed in the element body, and an outer electrode that is disposed on the outer surface of the element body and is electrically connected to the inner conductor. In the electronic component described in Japanese Unexamined Patent Publication No. 2004-128448, a glass layer is formed on the outer surface of the element body in which the outer electrode is not disposed.

However, in the convention electronic component, the glass layer is not formed on the outer surface of the element body in which the outer electrode is disposed. Accordingly, when a plated layer is formed in the process of forming the outer electrode, a plating solution may permeate the element body from the outer surface of the element body. When the plating solution permeates the element body, characteristics of the electronic component may deteriorate.

An aspect of the invention provides an electronic component that can prevent a plating solution from permeating an element body and achieve improvement in connectivity between an inner conductor and an outer electrode.

Summary

An electronic component according to an aspect of the invention includes: an element body that is formed by stacking a plurality of insulator layers, has a rectangular parallelepiped shape, and includes a pair of end surfaces facing each other, a pair of principal surfaces facing each other, and a pair of side surfaces facing each other; a plurality of inner conductors that are installed in the element body; a glass layer that is disposed on the pair of end surfaces, the pair of principal surfaces, and the pair of side surfaces of the element body; and a pair of outer electrodes that are disposed on the glass layer of the pair of end surfaces and are electrically connected to the inner conductors, and a thickness of a part of the glass layer not covered with the pair of outer electrodes is larger than a thickness of a part covered with the pair of outer electrodes.

In the electronic component according to the aspect of the invention, the glass layer is disposed on the surfaces of the element body. Accordingly, it is possible to prevent the plating solution from permeating the element body from the outer surface of the element body. As a result, it is possible to suppress deterioration in characteristics of the electronic component. In the electronic component according to the aspect, the thickness of the part in the glass layer which is not covered with the outer electrode is larger than the thickness of the part which is covered with the outer electrode. When the thickness of the glass layer disposed between the outer electrode and the element body is large, the electrical connectivity between the inner conductor and the outer electrode may decrease. In the electronic component according to the aspect, the thickness of the glass layer covered with the outer electrode is smaller than the thickness of the part not covered with the outer electrode. Accordingly, it is possible to secure connectivity between the inner conductor and the outer electrode. Accordingly, in the electronic component according to the aspect, it is possible to prevent the plating solution from permeating the element body and to achieve improvement in connectivity between the inner conductor and the outer electrode.

In the aspect, each of the pair of outer electrodes may include a first electrode portion that is located on one end surface, second electrode portions that are located on the pair of principal surfaces, and third electrode portions that are located on the pair of side surfaces, and the thickness of the glass layer disposed between one end surface and the first electrode portion may be smaller than the thickness of the glass layer disposed between one principal surface and the second electrode portion and the thickness of the glass layer disposed between one side surface and the third electrode portion. The plating solution is likely to permeate the element body from the ends of the outer electrode. In the electronic component according to the aspect, the thickness of the glass layer disposed between the end surface and the first electrode portion is smaller than the thickness of the glass layer disposed between the principal surface and the second electrode portion and the thickness of the glass layer disposed between the side surface and the third electrode portion. That is, in the electronic component according to the aspect, by setting the thickness of the glass layer between the end of the outer electrode and the element body to be relatively large, it is possible to prevent the plating solution from permeating the element body from the end of the outer electrode and to achieve improvement in connectivity between the inner conductor and the outer electrode.

According to the aspect of the invention, it is possible to prevent the plating solution from permeating the element body and to achieve improvement in connectivity between the inner conductor and the outer electrode.

Figure 7:
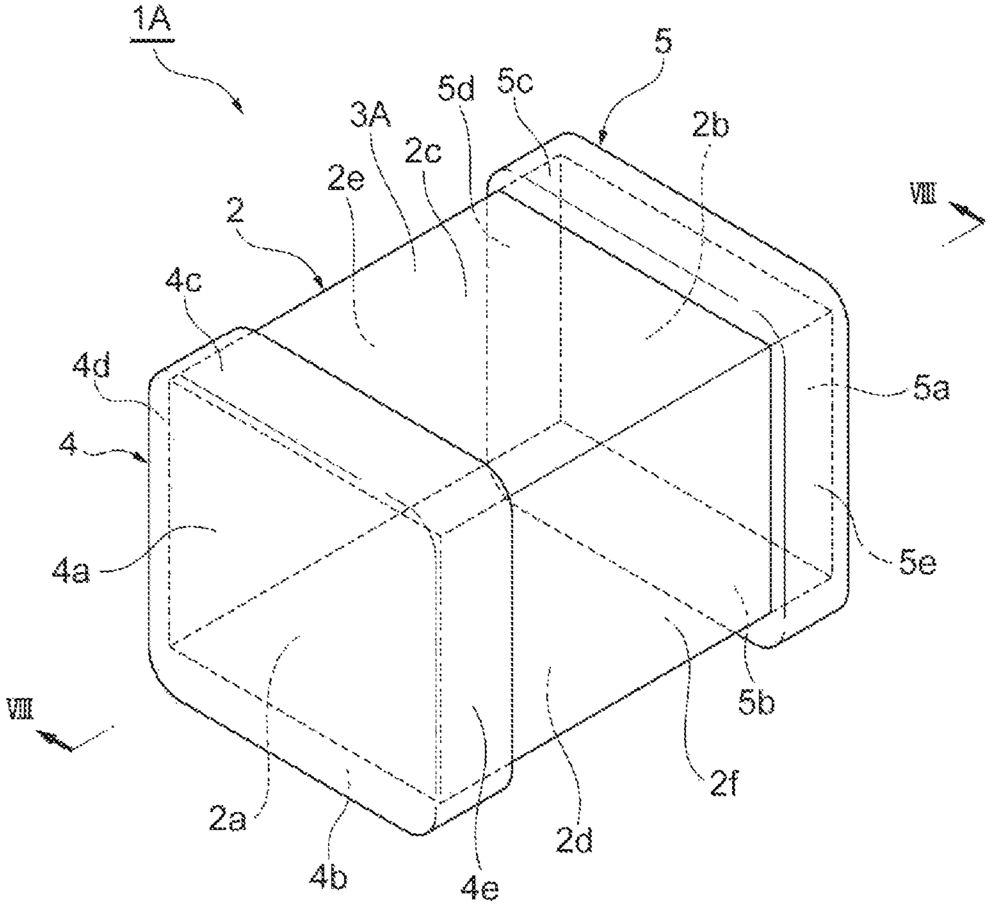
FIG. 7 is a perspective view illustrating a stacked coil component according to a second embodiment.

The second embodiment will be described below in detail. As illustrated in FIG. 7, a stacked coil component (an electronic component) 1A according to the second embodiment includes an element body 2 and a pair of outer electrodes 4 and 5 that are disposed at both ends of the element body 2. The element body 2 has the same configuration as the element body 2 in the first embodiment.

Figure 8:
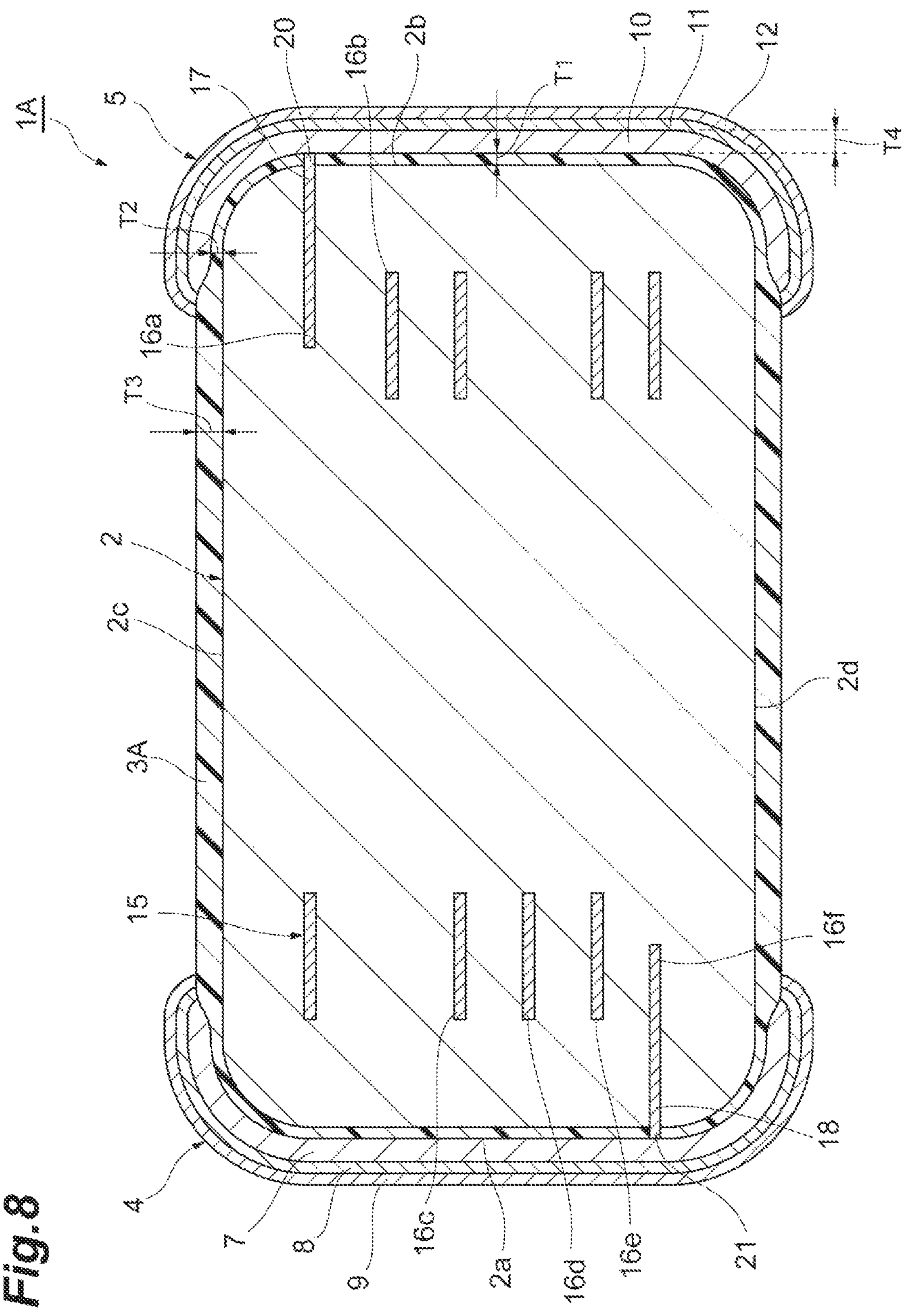
FIG. 8 is a diagram illustrating a cross-sectional configuration taken along line VIII-VIII in FIG. 7.

The outer electrode 4 is disposed on the end surface 2*a* side of the element body 2. The outer electrode 5 is disposed on the end surface 2*b* of the element body 2. As illustrated in FIG. 8, the outer electrode 4 includes a baked electrode layer 7, a first plated layer 8, and a second plated layer 9. In the outer electrode 4, the baked electrode layer 7, the first plated layer 8, and the second plated layer 9 are arranged in this order from the element body 2 side.

As illustrated in FIG. 7, the outer electrode 4 includes five electrode portions of an electrode portion (a first electrode portion) 4*a* located on the end surface 2*a*, an electrode portion (a second electrode portion) 4*b* located on the principal surface 2*d*, an electrode portion (a second electrode portion) 4*c* located on the principal surface 2*c*, an electrode portion (a third electrode portion) 4*d* located on the side surface 2*e*, and an electrode portion (a third electrode portion) 4*e* located on the side surface 2*f*.

As illustrated in FIG. 8, the outer electrode 5 includes a baked electrode layer 10, a first plated layer 11, and a second plated layer 12. In the outer electrode 5, the baked electrode layer 10, the first plated layer 11, and the second plated layer 12 are arranged in this order from the element body 2 side.

As illustrated in FIG. 7, the outer electrode 5 includes five electrode portions of an electrode portion (a first electrode portion) 5*a* located on the end surface 2*b*, an electrode portion (a second electrode portion) 5*b* located on the principal surface 2*d*, an electrode portion (a second electrode portion) 5*c* located on the principal surface 2*c*, an electrode portion (a third electrode portion) 5*d* located on the side surface 2*e*, and an electrode portion (a third electrode portion) 5*e* located on the side surface 2*f*.

As illustrated in FIG. 8, the stacked coil component 1A includes a glass layer 3A disposed on the surface of the element body 2. The glass layer 3A is disposed on the end surfaces 2*a* and 2*b*, the principal surfaces 2*c* and 2*d*, and the side surfaces 2*e* and 2*f* of the element body 2. That is, the glass layer 3A is disposed to cover the entire surface of the element body 2.

When the thickness of the glass layer 3A disposed between the end surfaces 2*a* and 2*b* and the electrode portions 4*a* and 5*a* of the outer electrodes 4 and 5 is defined as T1, the thickness of the glass layer 3A disposed between the principal surfaces 2*c* and 2*d* (2*e* and 2*f*) and the electrode portions 4*b*, 5*b*, 4*c*, and 5*c* of the outer electrodes 4 and 5 is defined as T2, and the thickness of the glass layer 3A of a part which is not covered with the outer electrodes 4 and 5 in the side surfaces 2*c* and 2*d* (2*e* and 2*f*) is defined as T3, the following relationship is satisfied.

$$T1<T2<T3$$

That is, in the glass layer 3A, the thickness T3 of the part not covered with the outer electrodes 4 and 5 is larger than the thicknesses T1 and T2 of the parts covered with the outer electrodes 4 and 5. In the glass layer 3A, the thickness T1 of the glass layer 3A disposed between the end surfaces 2*a* and 2*b* and the electrode portions 4*a* and 5*a* is smaller than the thickness T2 of the glass layer 3A disposed between the principal surfaces 2*c* and 2*d* and the electrode portions 4*b*, 5*b*, 4*c*, and 5*c* and the thickness T2 of the glass layer 3A disposed between the side surfaces 2*e* and 2*f* and the electrode portions 4*d*, 5*d*, 4*e*, and 5*e*.

The thickness T1 of the glass layer 3A disposed between the end surfaces 2*a* and 2*b* and the electrode portions 4*a* and 5*a* is smaller than the thickness T4 of the baked electrode layers 7 and 10 of the outer electrodes 4 and 5 (the electrode portions 4*a* and 5*a*) located on the end surfaces 2*a* and 2*b*. In other words, the thickness T4 of the baked electrode layers 7 and 10 of the outer electrodes 4 and 5 located on the end surfaces 2*a* and 2*b* is larger than the thickness T1 of the glass layer 3A disposed between the end surfaces 2*a* and 2*b* and the electrode portions 4*a* and 5*a*. The thickness T1 of the glass layer 3A disposed between the end surfaces 2*a* and 2*b* and the electrode portions 4*a* and 5*a*, the thickness T3 of the glass layer 3A of the part not covered with the outer electrodes 4 and 5, and the thickness T4 of the baked electrode layers 7 and 10 of the outer electrodes 4 and 5 located on the end surfaces 2*a* and 2*b* satisfy the following relationship.

$$T1+T4>T3$$

As illustrated in FIG. 8, the stacked coil component 1A includes a coil 15 that is disposed in the element body 2. The coil 15 includes a plurality of coil conductors (inner conductors) 16*a*, 16*b*, 16*c*, 16*d*, 16*e*, and 16*f*. The coil 15 has the same configuration as the coil in the first embodiment.

The coil conductor 16*a* includes a connection conductor 17. The connection conductor 17 electrically connects the coil conductor 16*a* to the outer electrode 5. The coil conductor 16*f* includes a connection conductor 18. The connection conductor 18 electrically connects the coil conductor 16*f* to the outer electrode 4. In this embodiment, a conductor pattern of the coil conductor 16*a* and a conductor pattern of the connection conductor 17 are integrally formed continuous, and a conductor pattern of the coil conductor 16*f* and a conductor pattern of the connection conductor 18 are integrally formed continuous.

The connection conductor 17 includes a protruding portion 20. The protruding portion 20 is disposed on the end surface 2*b* side of the element body 2 in the connection conductor 17. The protruding portion 20 protrudes from the end surface 2*b* of the element body 2 to the outer electrode 5. The protruding portion 20 penetrates the glass layer 3 and is connected to the baked electrode layer 10 of the outer electrode 5.

The connection conductor 18 includes a protruding portion 21. The protruding portion 21 is disposed on the end surface 2*a* side of the element body 2 in the connection conductor 18. The protruding portion 21 protrudes from the end surface 2*a* of the element body 2 to the outer electrode 4. The protruding portion 21 penetrates the glass layer 3 and is connected to the baked electrode layer 7 of the outer electrode 4.

As described above, in the stacked coil component 1A according to this embodiment, the glass layer 3A is disposed on the whole surface of the surfaces 2*a* to 2*f* of the element body 2. Accordingly, it is possible to prevent the plating solution from permeating the element body 2 from the outer surface of the element body 2. As a result, it is possible to suppress deterioration in characteristics of the stacked coil component 1A. The thickness of the part of the glass layer 3A not covered with the outer electrodes 4 and 5 is larger than the thickness of the part covered with the outer electrodes 4 and 5. When the thickness of the glass layer 3A disposed between the outer electrodes 4 and 5 and the element body 2 is large, there is a risk that electrical connectivity between the coil 15 and the outer electrodes 4 and 5 will decrease. In the stacked coil component 1A, the thickness of the glass layer 3A covered with the outer electrodes 4 and 5 is smaller than the thickness of the part not covered with the outer electrodes 4 and 5. Accordingly, it is possible to secure connectivity between the inner conductor and the outer electrodes 4 and 5. As a result, in the stacked coil component 1A, it is possible to prevent the plating solution from permeating the element body 2 from the surfaces 2*a* to 2*f* thereof on which the outer electrodes 4 and 5 are disposed and to achieve improvement in connectivity between the inner conductor and the outer electrodes 4 and 5.

In the stacked coil component 1A according to this embodiment, the outer electrodes 4 and 5 include the electrode portions 4*a* and 5*a* that are located on the end surfaces 2*a* and 2*b*, the electrode portions 4*b*, 5*b*, 4*c*, and 5*c* that are located on the pair of principal surfaces 2*c* and 2*d*, and the electrode portions 4*d*, 5*d*, 4*e*, and 5*e* that are located on the pair of side surfaces 2*e* and 2*f*. In the stacked coil component 1A, the thickness of the glass layer 3A disposed between the end surfaces 2*a* and 2*b* and the electrode portions 4*a* and 5*a* is smaller than the thickness of the glass layer 3A disposed between the principal surfaces 2*c* and 2*d* and the electrode portions 4*b*, 5*b*, 4*c*, and 5*c* and the thickness of the glass layer 3A disposed between the side surfaces 2*e* and 2*f* and the electrode portions 4*d*, 5*d*, 4*e*, and 5*e*. The plating solution is likely to permeate the element body from the ends of the outer electrodes 4 and 5. In the stacked coil component 1A, the thickness of the glass layer 3A disposed between the end surfaces 2*a* and 2 and the electrode portions 4*a* and 5*a* is set to be smaller than the thickness of the glass layer 3A disposed between the principal surfaces 2*c* and 2*d* and the electrode portions 4*b*, 5*b*, 4*c*, and 5*c* and the thickness of the glass layer 3A disposed between the side surfaces 2*e* and 2*f* and the electrode portions 4*d*, 5*d*, 4*e*, and 5*e*. That is, in the stacked coil component 1A, by setting the thickness of the glass layer 3A between the ends of the outer electrodes 4 and 5 and the element body 2 to be relatively large, it is possible to prevent the plating solution from permeating the element body from the ends of the outer electrodes 4 and 5 and to achieve improvement in connectivity between the coil conductors 16*a* and 16*f* and the outer electrodes 4 and 5.

In the stacked coil component 1A according to this embodiment, the outer electrodes 4 and 5 include the baked electrode layers 7 and 10, the first plated layers 8 and 11, and the second plated layers 9 and 12. In this way, in the stacked coil component 1A, it is possible to prevent the plating solution from permeating the element body 2 in the process of forming the outer electrodes 4 and 5 including the first plated layers 8 and 11 and the second plated layers 9 and 12.

While the second embodiment of the invention has been described above, the invention is not limited to the above-mentioned embodiment but can be modified in various forms without departing from the gist thereof.

In the second embodiment, an example in which the inner conductor includes the coil conductors 16*a* to 16*f* and the electronic component is the stacked coil component 1 has been described above. However, the electronic component may be a capacitor.

In the second embodiment, an example in which the outer electrodes 4 and 5 include the electrode portions 4*a* and 5*a*, the electrode portions 4*b*, 5*b*, 4*c*, and 5*c*, and the electrode portions 4*d*, 5*d*, 4*e*, and 5*e* has been described. However, the shape of the outer electrodes is not limited thereto. For example, the outer electrodes may be formed on only the end surfaces or may be formed on at least one of the end surfaces, the principal surfaces, and the side surfaces.

Third Embodiment

A third embodiment will be described below. First, the background and summary of the third embodiment will be described.

Background

An electronic component that includes an element body, an inner conductor that is disposed in the element body, and an outer electrode that is disposed on the outer surface of the element body and is electrically connected to the inner conductor is known (for example, see Japanese Unexamined Patent Publication No. 2010-040860).

In an electronic component, an outer electrode generally includes a baked electrode layer and a plated layer. In the electronic component, when the plated layer is formed, there is a risk that a plating solution will permeate the element body. In the conventional electronic component, there is a risk that a crack will be generated between the element body and the outer electrode by expansion (tensile stress) and contraction (compressive stress) of the baked electrode layer due to a thermal shock at the time of soldering or the like.

An aspect of the invention provides an electronic component that can prevent a plating solution from permeating an element body and achieve improvement in resistance to a thermal shock of an outer electrode.

Summary

An electronic component according to an aspect of the invention includes: an element body in which a plurality of insulator layers are stacked; an inner conductor that is installed in the element body; and an outer electrode that is disposed on an outer surface of the element body and is electrically connected to the inner conductor, the outer electrode includes a first electrode layer that is disposed on the outer surface of the element body and a second electrode layer that is disposed on the outer side of the element body from the first electrode layer, a plurality of connecting portions that electrically connects the first electrode layer and the second electrode layer and a plurality of insulating portions that electrically insulates the first electrode layer and the second electrode layer from each other are disposed between the first electrode layer and the second electrode layer, and the insulating portions are filled with glass.

In the electronic component according to the aspect of the invention, a plurality of connecting portions are disposed between the first electrode layer and the second electrode layer. Accordingly, in the electronic component according to the aspect, since the electrical connection between the first electrode layer and the second electrode layer is guaranteed, it is possible to satisfactorily secure electrical connection between the inner conductor and the outer electrode. A plurality of insulating portions are disposed between the first electrode layer and the second electrode layer. The insulating layers are filled with glass. Accordingly, in the electronic component according to the aspect, for example, when a plated layer of the outer electrode is formed, it is possible to prevent the plating solution from permeating the element body. Since the insulating portions of glass are disposed outside the first electrode layer, it is possible to relax a thermal shock to the first electrode layer using the insulating portions of glass. Accordingly, it is possible to suppress expansion and contraction of the first electrode layer. As a result, in the electronic component according to the aspect, it is possible to achieve improvement in resistance to a thermal shock of the outer electrode.

In the aspect, a glass layer may be disposed in a part of the outer surface of the element body exposed from the outer electrode. In this configuration, for example, when a plated layer of the outer electrode is formed, it is possible to further prevent a plating solution from permeating the element body and to prevent a plating metal from being extracted from the outer surface of the element body.

In the aspect, a thickness of the first electrode layer may be smaller than a thickness of the second electrode layer. Since the first electrode layer is disposed between the element body and the second electrode layer, it is difficult to release a stress due to expansion and contraction. Accordingly, by setting the thickness of the first electrode layer to be smaller than the thickness of the second electrode layer, it is possible to decrease the stress in the first electrode layer in comparison with the second electrode layer. As a result, it is possible to further achieve improvement in resistance to a thermal shock of the outer electrode.

According to the aspect of the invention, it is possible to prevent a plating solution from permeating the element body and to achieve improvement in resistance to a thermal shock of the outer electrode.

Figure 9:
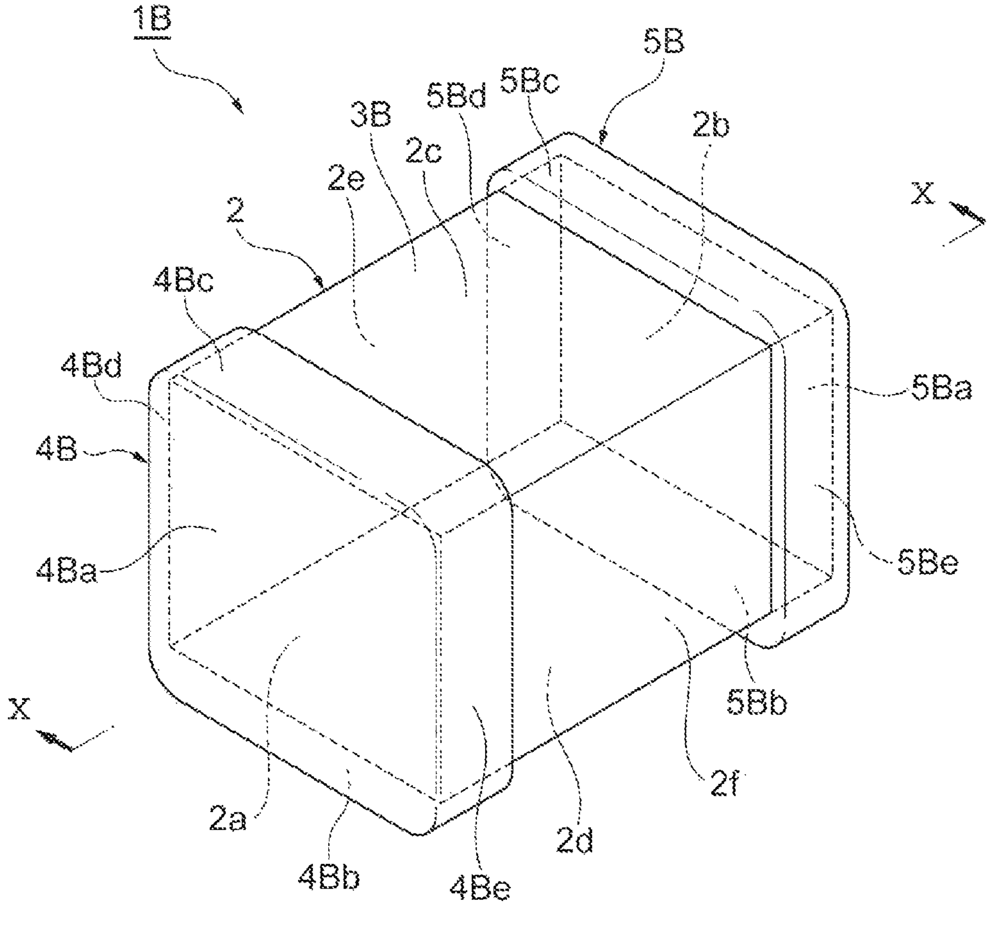
FIG. 9 is a perspective view illustrating a stacked coil component according to a third embodiment.

The third embodiment will be described below in detail. As illustrated in FIG. 9, a stacked coil component (an electronic component) 1B according to the third embodiment includes an element body 2 and a pair of outer electrodes 4B and 5B that are disposed at both ends of the element body 2. The element body 2 has the same configuration as the element body 2 in the first embodiment.

Figure 10:
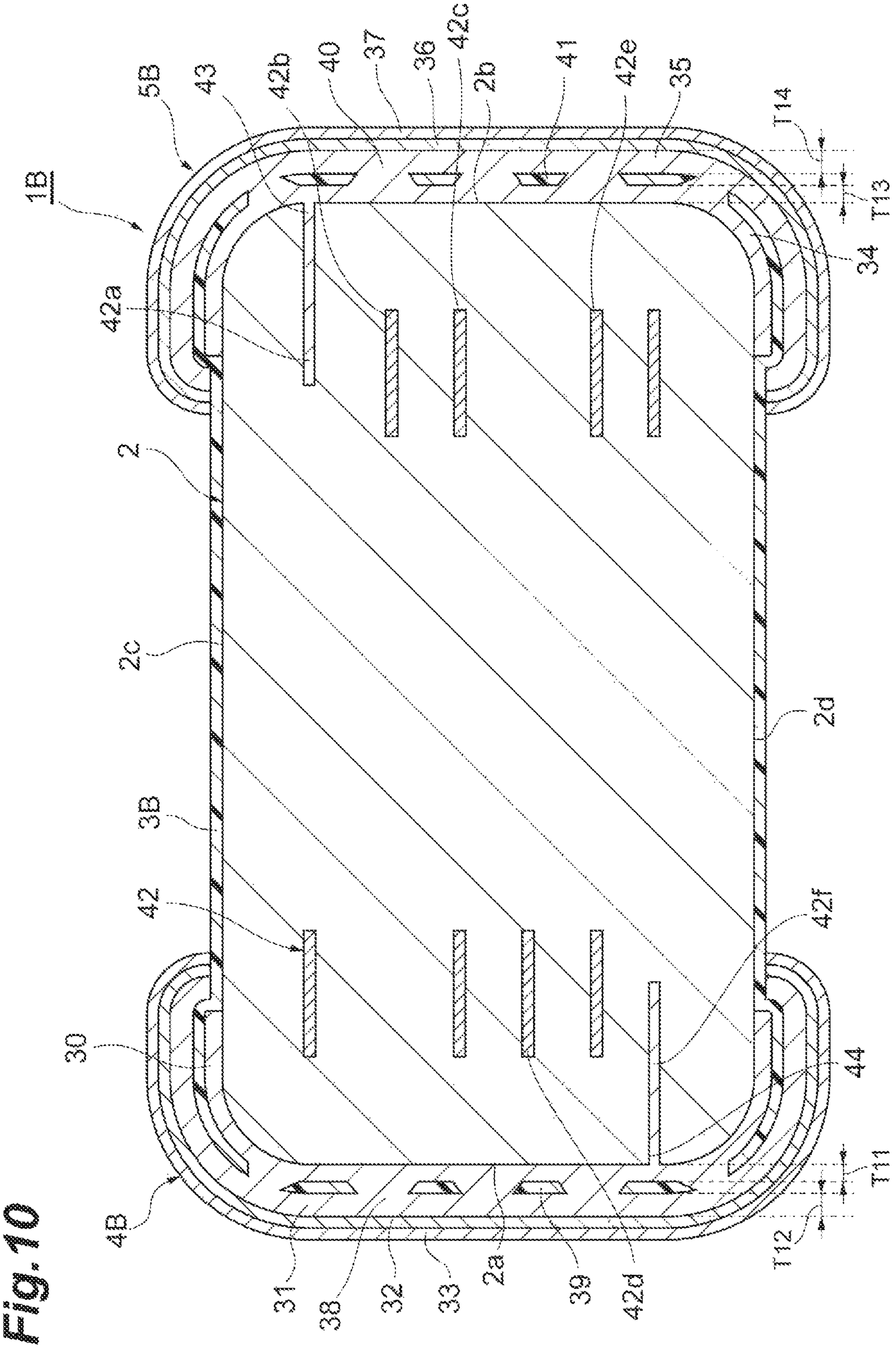
FIG. 10 is a diagram illustrating a cross-sectional configuration taken along line X-X in FIG. 9.

As illustrated in FIG. 10, a glass layer 3B is disposed on the principal surfaces 2*c* and 2*d* and the side surfaces 2*e* and 2*f* of the element body 2. The glass layer 3B is disposed in at least a part of the outer surface of the element body 2 exposed from the outer electrodes 4B and 5B. The thickness of the glass layer 3B ranges, for example, from 0.5 μm to 10 μm. It is preferable that the glass layer 3B have a high softening point and the softening point is equal to or higher than, for example, 600° C.

The outer electrode 4B is disposed on the end surface 2*a* side of the element body 2. The outer electrode 5B is disposed on the end surface 2*b* of the element body 2. That is, the outer electrodes 4B and 5B are separated from each other in the direction in which the pair of end surfaces 2*a* and 2*b* faces each other. The outer electrodes 4B and 5B have a substantially rectangular shape in a plan view and the corners thereof are rounded.

The outer electrode 4B includes a first baked electrode layer (a first electrode layer) 30, a second baked electrode layer (a second electrode layer) 31, a first plated layer 32, and a second plated layer 33. The first baked electrode layer 30 and the second baked electrode layer 31 include a conductive material. The first baked electrode layer 30 and the second baked electrode layer 31 are formed as a sintered compact of a conductive paste including conductive metal powder (Ag and/or Pd powder) and glass frit. The first plated layer 32 is an Ni-plated layer. The second plated layer 33 is an Sn-plated layer.

As illustrated in FIG. 9, the outer electrode 4B includes five electrode portions of an electrode portion 4Ba located on the end surface 2*a*, an electrode portion 4Bb located on the principal surface 2*d*, an electrode portion 4Bc located on the principal surface 2*c*, an electrode portion 4Bd located on the side surface 2*e*, and an electrode portion 4Be located on the side surface 2*f*. The electrode portion 4Ba covers a whole of the end surface 2*a*. The electrode portion 4Bb covers a part of the principal surface 2*d*. The electrode portion 4Bc covers a part of the principal surface 2*c*. The electrode portion 4Bd covers a part of the side surface 2*e*. The electrode portion 4Be covers a part of the side surface 2*f*. The five electrode portions 4Ba, 4Bb, 4Bc, 4Bd, and 4Be are integrally formed.

As illustrated in FIG. 10, the outer electrode 5B includes a first baked electrode layer (a first electrode layer) 34, a second baked electrode layer (a second electrode layer) 35, a first plated layer 36, and a second plated layer 37. The first baked electrode layer 34 and the second baked electrode layer 35 includes a conductive material. The first baked electrode layer 34 and the second baked electrode layer 35 are formed as a sintered compact of a conductive paste including conductive metal powder (Ag and/or Pd powder) and glass frit. The first plated layer 36 is an Ni-plated layer. The second plated layer 37 is an Sn-plated layer.

As illustrated in FIG. 9, the outer electrode 5B includes five electrode portions of an electrode portion 5Ba located on the end surface 2*b*, an electrode portion 5Bb located on the principal surface 2*d*, an electrode portion 5Bc located on the principal surface 2*c*, an electrode portion 5Bd located on the side surface 2*e*, and an electrode portion 5Be located on the side surface 2*f*. The electrode portion 5Ba covers a whole of the end surface 2*b*. The electrode portion 5Bb covers a part of the principal surface 2*d*. The electrode portion 5Bc covers a part of the principal surface 2*c*. The electrode portion 5Bd covers a part of the side surface 2*e*. The electrode portion 5Be covers a part of the side surface 2*f*. The five electrode portions 5Ba, 5Bb, 5Bc, 5Bd, and 5Be are integrally formed.

The configuration of the outer electrodes 4B and 5B will be described below in detail. As illustrated in FIG. 10, in the outer electrode 4B, a connecting portion 38 and an insulating portion 39 are disposed between the first baked electrode layer 30 and the second baked electrode layer 31. The connecting portion 38 electrically connects the first baked electrode layer 30 and the second baked electrode layer 31 to each other. The insulating portion 39 is glass. The insulating portion 39 electrically insulates the first baked electrode layer 30 and the second baked electrode layer 31 from each other. A plurality of connecting portions 38 and a plurality of insulating portions 39 are mixed between the first baked electrode layer 30 and the second baked electrode layer 31. Accordingly, the first baked electrode layer 30 and the second baked electrode layer 31 are partially electrically connected to each other. The first baked electrode layer 30 and the second baked electrode layer 31 are integrally formed by the connecting portions 38.

The thickness T11 of the first baked electrode layer 30 is smaller than the thickness T12 of the second baked electrode layer 31 (T11<T12). In other words, the thickness T12 of the second baked electrode layer 31 is larger than the thickness T11 of the first baked electrode layer 30.

In the outer electrode 5B, a connecting portion 40 and an insulating portion 41 are disposed between the first baked electrode layer 34 and the second baked electrode layer 35. The connecting portion 40 electrically connects the first baked electrode layer 34 and the second baked electrode layer 35 to each other. The insulating portion 41 is glass. The insulating portion 41 electrically insulates the first baked electrode layer 34 and the second baked electrode layer 35 from each other. A plurality of connecting portions 40 and a plurality of insulating portions 41 are mixed between the first baked electrode layer 34 and the second baked electrode layer 35. Accordingly, the first baked electrode layer 34 and the second baked electrode layer 35 are partially electrically connected to each other. The first baked electrode layer 34 and the second baked electrode layer 35 are integrally formed by the connecting portions 40.

The thickness T13 of the first baked electrode layer 34 is smaller than the thickness T14 of the second baked electrode layer 35 (T13<T14). In other words, the thickness T14 of the second baked electrode layer 35 is larger than the thickness T13 of the first baked electrode layer 34.

Figure 11:
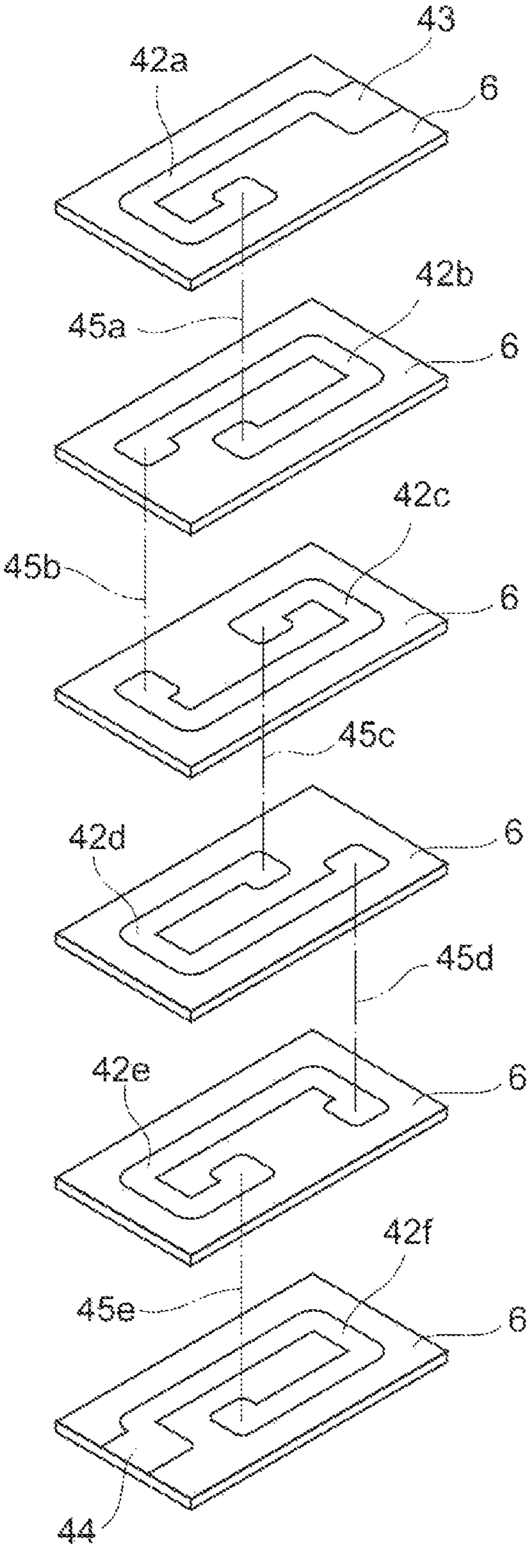
FIG. 11 is a perspective view illustrating a coil conductor of the stacked coil component according to the third embodiment.

The stacked coil component 1B includes a coil 42 that is disposed in the element body 2. As illustrated in FIG. 11, the coil 42 includes a plurality of coil conductors (inner conductors) 42*a*, 42*b*, 42*c*, 42*d*, 42*e*, and 42*f*.

The plurality of coil conductors 42*a* to 42*f* are formed of, for example, a material including Ag and/or Pd as a conductive material. The plurality of coil conductors 42*a* to 42*f* are formed as sintered compacts of a conductive paste including Ag and/or Pd as a conductive material. The coil conductor 42*a* includes a connection conductor 43. The connection conductor 43 electrically connects the coil conductor 42*a* to the outer electrode 5B. The coil conductor 42*f* includes a connection conductor 44. The connection conductor 44 electrically connects the coil conductor 42*f* to the outer electrode 4B. The connection conductor 43 and the connection conductor 44 are formed using Ag and/or Pd as a conductive materials. In this embodiment, a conductor pattern of the coil conductor 42*a* and a conductor pattern of the connection conductor 43 are integrally formed continuous, and a conductor pattern of the coil conductor 42*f* and a conductor pattern of the connection conductor 44 are integrally formed continuous.

The coil conductors 42*a* to 42*f* are arranged in the stacking direction of the insulator layers 6 in the element body 2. The coil conductors 42*a* to 42*f* are arranged in the order of the coil conductor 42*a*, the coil conductor 42*b*, the coil conductor 42*c*, the coil conductor 42*d*, the coil conductor 42*e*, and the coil conductor 42*f* from the outermost layer.

The ends of the coil conductors 42*a* to 42*f* are connected by through-hole conductors 45*a* to 45*e*. Accordingly, the coil conductors 42*a* to 42*f* are electrically connected to each other and the coil 42 is formed in the element body 2. The through-hole conductors 45*a* to 45*e* include Ag and/or Pd as a conductive material and are formed as sintered compacts of a conductive material including the conductive material.

A method of manufacturing the stacked coil component 1B will be described below with reference to FIGS. 12A and 12B and FIGS. 13A and 13B.

Figure 12A:
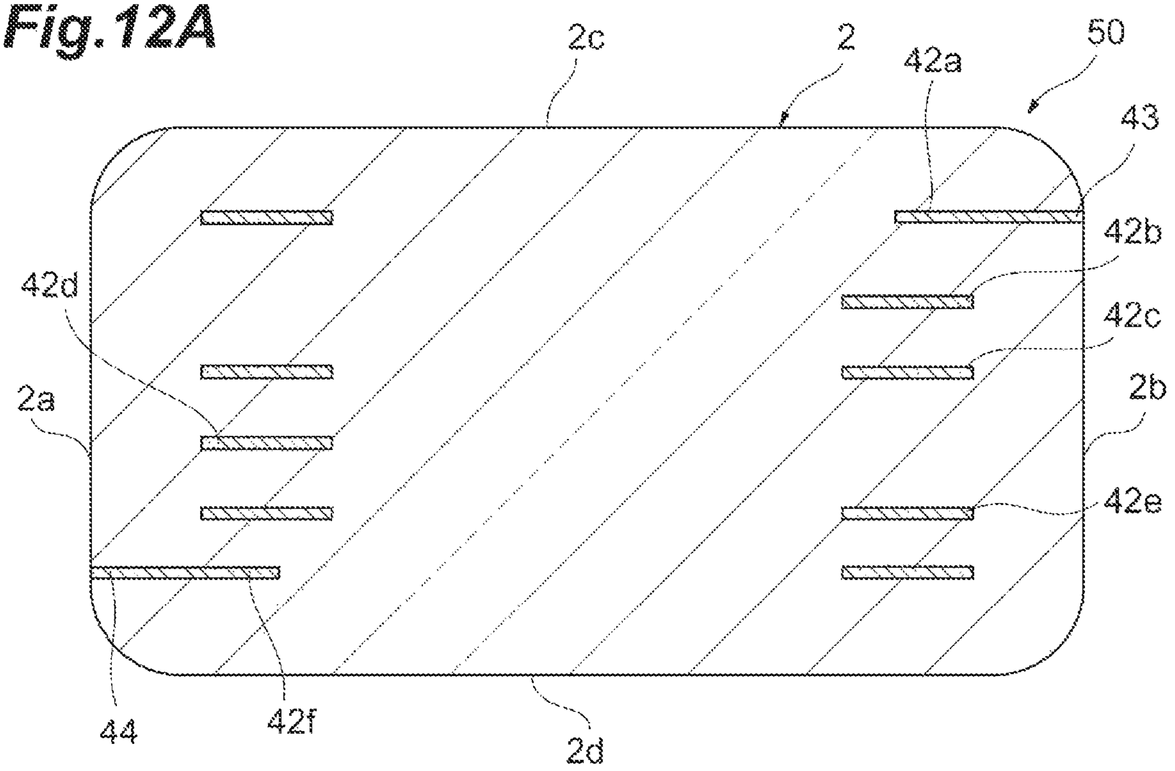
FIGS. 12A and 12B are diagrams illustrating a method of manufacturing the stacked coil component according to the third embodiment.

As illustrated in FIG. 12A, first, a stacked body 50 including element body 2 and the coil 42 is formed. Specifically, ceramic powder, organic solvent, organic binder, plasticizer, and the like are mixed to form ceramic slurry, and then the ceramic slurry is shaped into a sheet shape using a doctor blade method to acquire a ceramic green sheet. Subsequently, by screen-printing a conductive paste containing Ag and/or Pd as a metal component on the ceramic green sheet, the conductor patterns of coil conductors 42*a* to 42*f*.

The connection conductor 43 of the coil conductor 42*a* is formed of a conductive paste containing Ag and/or Pd as a metal component. The conductor pattern of the connection conductor 43 may be formed at the same time as the conductor pattern of the coil conductor 42*a*. The connection conductor 44 of the coil conductor 42*f* is formed of a conductive paste containing Ag and/or Pd as metal components. The conductor pattern of the connection conductor 44 may be formed at the same time as the conductor pattern of the coil conductor 42*f*. The ceramic green sheets on which the conductor patterns are formed are stacked, and the resultant is subjected to a binder removing process in the atmosphere and is then subjected to baking. Accordingly, the stacked body 50 is obtained.

Figure 12B:
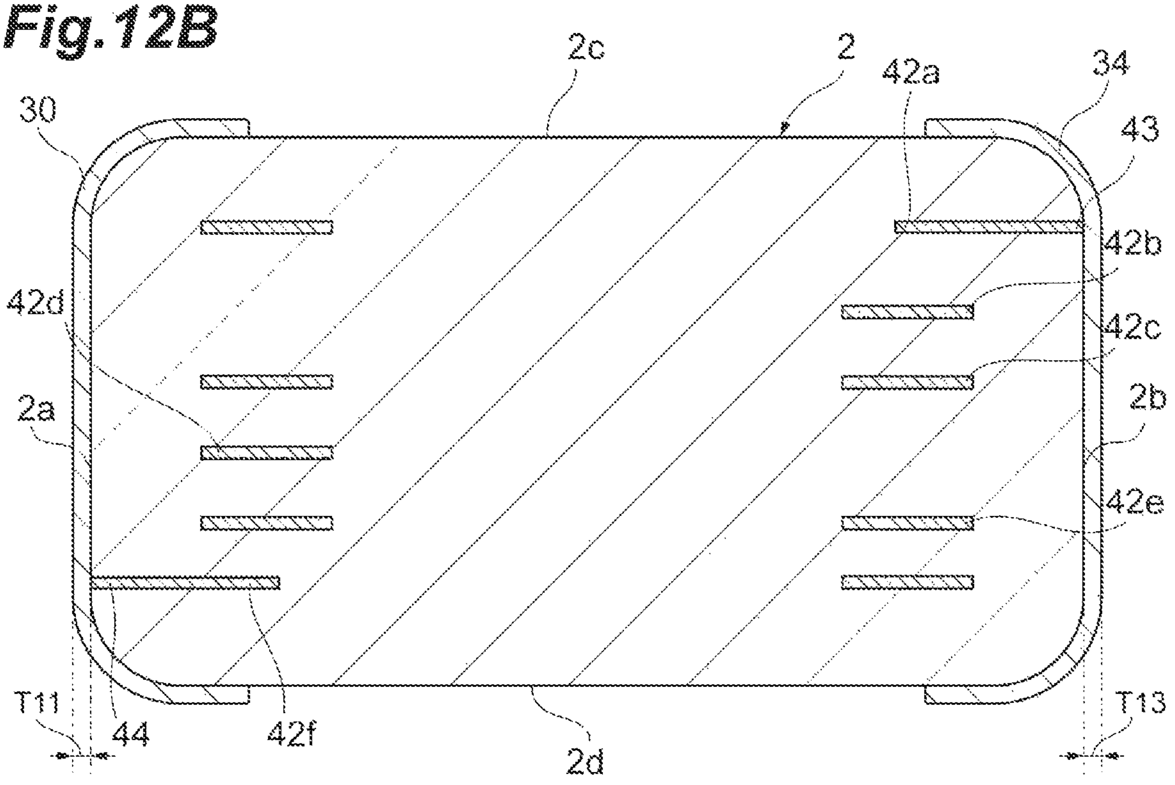

Subsequently, as illustrated in FIG. 12B, the first baked electrode layers 30 and 34 are formed. Specifically, the first baked electrode layers 30 and 34 are formed by applying and baking a conductive paste including Ag and/or Pd powder as conductive metal powder and glass frit. Accordingly, the first baked electrode layers 30 and 34 with thicknesses T11 and T13 are formed.

Figure 13A:
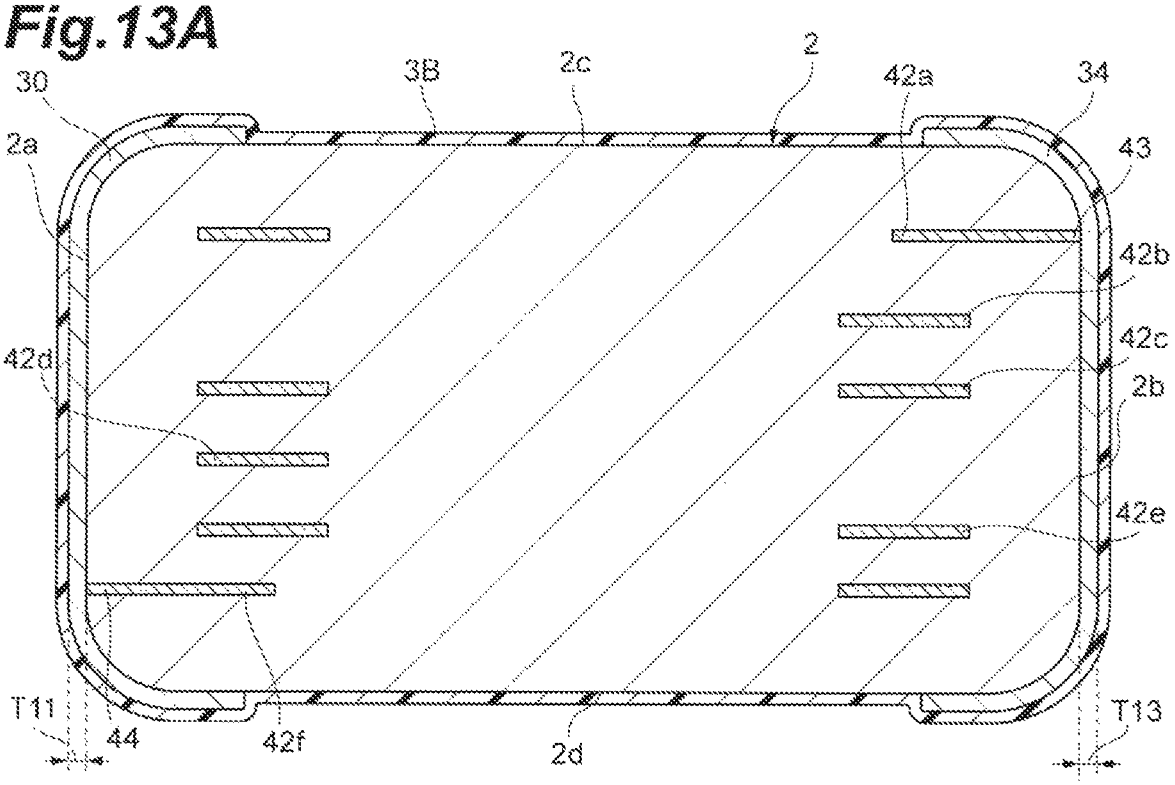
FIGS. 13A and 13B are diagrams illustrating a method of manufacturing the stacked coil component according to the third embodiment.

Subsequently, as illustrated in FIG. 13A, the glass layer 3B is formed. Specifically, the glass layer 3B is formed by applying glass slurry including glass powder, binder resin, solvent, and the like onto the principal surfaces 2*c* and 2*d* and the side surfaces 2*e* and 2*f* of the element body 2 and the first baked electrode layers 30 and 34. The application of the glass slurry is performed, for example, using a barrel spray method. The glass layer 3B is formed by simultaneously baking the glass slurry and a conductive paste to be described later for forming the second baked electrode layers 31 and 35. Accordingly, in FIG. 13A, a state in which the glass layer 3B is formed on the first baked electrode layers 30 and 34 is illustrated, but the glass layer 3B is actually formed when the second baked electrode layers 31 and 35 are baked.

Figure 13B:
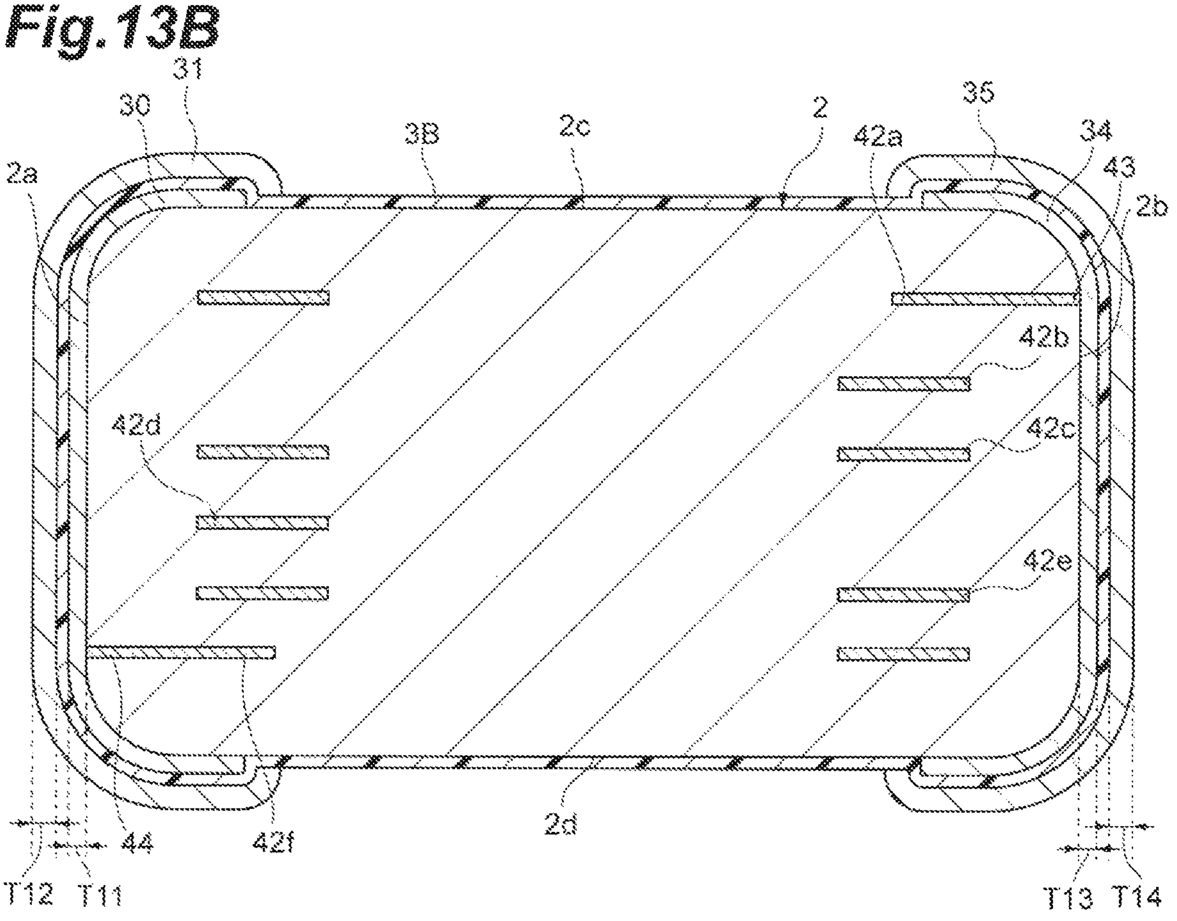

Subsequently, as illustrated in FIG. 13B, the second baked electrode layers 31 and 35 are formed. Specifically, the second baked electrode layers 31 and 35 are formed by applying a conductive paste including Ag and/or Pd powder as conductive metal powder and glass frit and baking the resultant. The conductive paste is applied on the glass slurry. The softening point of the glass frit is preferably lower than the softening point of glass powder forming the glass layer 3B. The conductive paste is applied to be thicker than the conductive paste for forming the first baked electrode layers 30 and 34. Accordingly, the second baked electrode layers 31 and 35 with thicknesses T12 and T14 larger than the thicknesses of the first baked electrode layers 30 and 34 with thicknesses T11 and T13. By baking the conductive paste and the glass slurry, the second baked electrode layers 31 and 35 and the glass layer 3B are formed.

When the glass slurry and the conductive paste are baked, the first baked electrode layers 30 and 34 and the second baked electrode layers 31 and 35 are electrically connected to each other. Specifically, when the conductive paste is baked, glass particles included in the glass frit for forming the glass layer 3B are melted and fluidized. Accordingly, the first baked electrode layers 30 and 34 and the second baked electrode layers 31 and 35 come in contact with each other.

Figure 14:
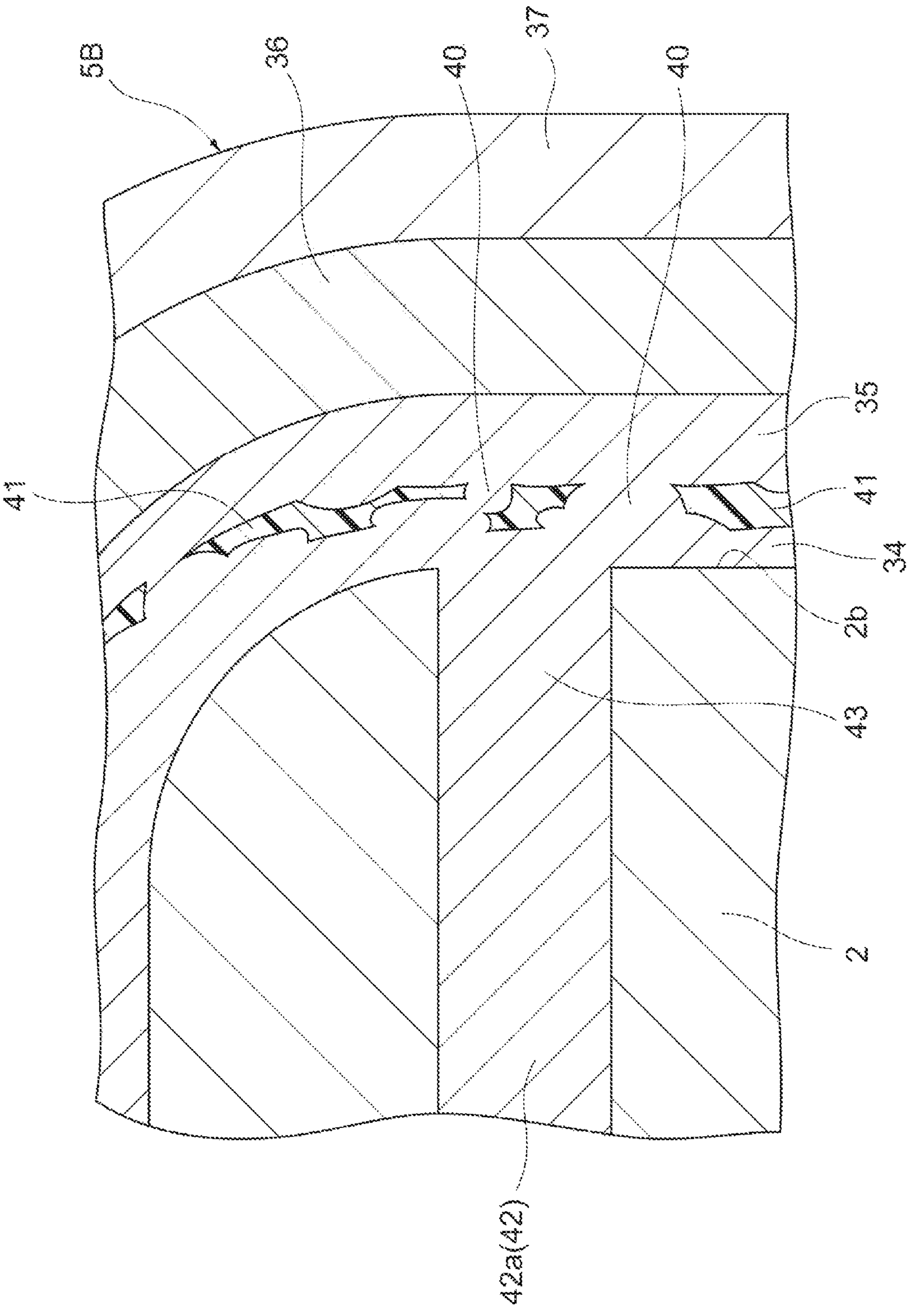
FIG. 14 is a diagram illustrating a method of manufacturing the stacked coil component according to the third embodiment.

As illustrated in FIG. 14, a connecting portion 40 (38) that electrically connects the first baked electrode layer 34 (30) and the second baked electrode layer 35 (31) and an insulating portion 41 (39) that electrically insulates the first baked electrode layer 34 (30) and the second baked electrode layer 35 (31) from each other are disposed between the first baked electrode layer 34 (30) and the second baked electrode layer 35 (31). A plurality of connecting portions 40 (38) and a plurality of insulating portions 41 (39) are disposed between the first baked electrode layer 34 (30) and the second baked electrode layer 35 (31) and are irregularly mixed. Since the insulating portion 41 (39) is formed by sintering the glass slurry, the insulating portion 41 (39) is filled with glass.

Subsequently, as illustrated in FIG. 10, the first plated layers 32 and 36 and the second plated layers 33 and 37 are formed. The first plated layers 32 and 36 are Ni-plated layers. The first plated layers 32 and 36 are formed, for example, by extracting Ni in a Watt bath using a barrel plating method. The second plated layers 33 and 37 are Sn-plated layers. The second plated layers 33 and 37 are formed by extracting Sn in a neutral tinning bath using the barrel plating method. In this way, the stacked coil component 1B is manufactured.

As described above, in the stacked coil component 1B according to this embodiment, the plurality of insulating portions 39 and 41 are disposed between the first baked electrode layers 30 and 34 and the second baked electrode layers 31 and 35. The insulating portions 39 and 41 are filled with glass. Accordingly, in the stacked coil component 1B when the first plated layers 32 and 36 and the second plated layers 33 and 37 of the outer electrodes 4B and 5B are formed, it is possible to prevent the plating solution from permeating the element body 2. Since the insulating portions 39 and 41 of glass are disposed outside the first baked electrode layers 30 and 34, the thermal shock to the first baked electrode layers 30 and 34 can be relaxed using the insulating portions 39 and 41 of glass. Accordingly, it is possible to suppress expansion and contraction of the first baked electrode layers 30 and 34. As a result, in the stacked coil component 1B, it is possible to achieve improvement in resistance to a thermal shock of the outer electrodes 4B and 5B.

In the stacked coil component, in order prevent the plating solution from permeating the element body in the process of forming the plated layers, a configuration in which the glass layer is disposed between the first baked electrode layer and the second baked electrode layer can be employed. However, in the configuration in which the glass layer is disposed between the first baked electrode layer and the second baked electrode layer and the coil conductor (the inner conductor) penetrates the first baked electrode layer and the glass layer and is electrically connected to the second baked electrode layer, the following problem may be caused. That is, in the stacked coil component, the electrical connection between the inner conductor and the second baked electrode layer is achieved at only one position in each outer electrode. Accordingly, when the connection at the single position is cut off for a certain reason, the stacked coil component may have a defect. In this way, in the configuration in which the glass layer is disposed between the first baked electrode layer and the second baked electrode layer, connectivity between the inner conductor and the outer electrode is not satisfactory. In case of a stacked capacitor, a plurality of inner electrodes (inner conductors) are connected to the outer electrode, but when the electrical connection between one inner electrode and the outer electrode is cut off, the characteristics of the stacked capacitor deteriorate.

On the other hand, in the stacked coil component 1B according to this embodiment, the first baked electrode layers 30 and 34 and the second baked electrode layers 31 and 35 are electrically connected to each other by a plurality of connecting portions 38 and 40. Accordingly, even when connection failure occurs in any one connecting portion 38 or 40, the connectivity between the coil 42 and the outer electrodes 4B and 5B can be satisfactorily secured by other connecting portions 38 and 40. Accordingly, in the stacked coil component 1B, it is possible to improve reliability.

In the stacked coil component 1B according to this embodiment, the glass layer 3B is disposed in the part of the outer surface of the element body 2 which is exposed from the outer electrodes 4B and 5B. In this configuration, when the first plated electrodes 32 and 36 and the second plated layers 33 and 37 of the outer electrodes 4B and 5B are formed, it is possible to further prevent the plating solution from permeating the element body 2 and to prevent the plating metal from being extracted from the outer surface of the element body 2.

In the stacked coil component 1B according to this embodiment, the thickness of the first baked electrode layers 30 and 34 is smaller than the thickness of the second baked electrode layers 31 and 35. Since the first baked electrode layers 30 and 34 are disposed between the element body 2 and the second baked electrode layers 31 and 35, it is difficult to release a stress due to expansion and contraction. Accordingly, by setting the thickness of the first baked electrode layers 30 and 34 to be smaller than the thickness of the second baked electrode layers 31 and 35, it is possible to set the stress in the first baked electrode layers 30 and 34 to be lower than that of the second baked electrode layers 31 and 35. As a result, in the stacked coil component 1B, it is possible to achieve improvement in resistance to a thermal shock of the outer electrodes 4B and 5B.

While the third embodiment of the invention has been described above, the invention is not limited to the above-mentioned embodiment but can be modified in various forms without departing from the gist thereof.

In the above-mentioned embodiment, an example in which the inner conductor includes the coil conductors 42*a* to 42*f* and the electronic component is the stacked coil component 1B has been described above. However, the electronic component may be a capacitor.

In the above-mentioned embodiment, an example in which the outer electrodes 4B and 5B include the electrode portions 4Ba and 5Ba, the electrode portions 4Bb, 5Bb, 4Bc, and 5Bc, and the electrode portions 4Bd, 5Bd, 4Be, and 5Be has been described. However, the shape of the outer electrodes is not limited thereto. For example, the outer electrodes may be formed on only the end surfaces or may be formed on at least one of the end surfaces, the principal surfaces, and the side surfaces (the outer electrodes may be formed in an L shape).

What is claimed is:

1. An electronic component comprising:

an element body in which a plurality of insulator layers are stacked, the element body having a rectangular parallelepiped shape with a pair of end surfaces facing each other and a pair of principal surfaces facing each other and extending to connect the pair of end surfaces to each other;

an inner conductor in the element body; and an outer electrode that (i) is on an outer surface of the element body, the outer surface being one of the pair of end surfaces of the element body, (ii) is electrically connected to the inner conductor and (iii) includes:

a first electrode layer including a first portion that is directly on the outer surface and a second portion that is directly on the pair of principal surfaces of the element body, the second portion being continuous from the first portion;

a second electrode layer that is on an opposite side of the first electrode layer from the element body;

a plurality of spaced connecting portions that (i) is between the first electrode layer and the second electrode layer and (ii) electrically connects the first electrode layer and the second electrode layer; and a plurality of spaced insulating portions that (i) is between the first electrode layer and the second electrode layer and (ii) electrically insulates the first electrode layer and the second electrode layer from each other, wherein:

the insulating portions are filled with glass;

each of the plurality of spaced connecting portions is separated, along the outer surface of the element body, from adjacent ones of the plurality of spaced connecting portions by one of the plurality of spaced insulating portions such that the first electrode layer and the second electrode layer are partially electrically connected to each other via the plurality of spaced connecting portions but not by the plurality of spaced insulating portions;

the second electrode layer covers an entirety of the first portion of the first electrode layer and an entirety of the second portion of the first electrode layer;

the second electrode layer includes: (i) a first cover portion formed on the outer surface and covering the entirety of the first portion of the first electrode layer, and (ii) a second cover portion formed on the pair of principal surfaces and covering the entirety of the second portion of the first electrode layer, and the plurality of spaced connecting portions are disposed only on the outer surface between the first cover portion of the second electrode layer and the first portion of the first electrode layer, without being disposed on the pair of principal surfaces between the second cover portion of the second electrode layer and the second portion of the first electrode layer.

2. The electronic component according to claim 1, wherein a glass layer is in a part of the outer surface of the element body exposed from the outer electrode.

3. The electronic component according to claim 1, wherein a thickness of the first electrode layer is smaller than a thickness of the second electrode layer.

4. The electronic component according to claim 1, wherein the first electrode layer and the second electrode layer have a same composition.

* * * * *